US012108106B2

(12) United States Patent
Kurabuchi

(10) Patent No.: US 12,108,106 B2
(45) Date of Patent: *Oct. 1, 2024

(54) VIDEO DISTRIBUTION DEVICE, VIDEO DISTRIBUTION METHOD, AND VIDEO DISTRIBUTION PROCESS

(71) Applicant: GREE, Inc., Tokyo (JP)

(72) Inventor: Aya Kurabuchi, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,686

(22) Filed: Aug. 3, 2023

(65) Prior Publication Data

US 2024/0015355 A1 Jan. 11, 2024

Related U.S. Application Data

(63) Continuation of application No. 17/244,956, filed on Apr. 30, 2021, now Pat. No. 11,750,873.

(30) Foreign Application Priority Data

Apr. 30, 2020 (JP) .................................. 2020-080004

(51) Int. Cl.
*H04N 21/431* (2011.01)
*H04N 21/437* (2011.01)
(Continued)

(52) U.S. Cl.
CPC ....... *H04N 21/4312* (2013.01); *H04N 21/437* (2013.01); *H04N 21/4784* (2013.01);
(Continued)

(58) Field of Classification Search
CPC ............. H04N 21/4312; H04N 21/437; H04N 21/4784; H04N 21/6543; H04N 21/658; H04N 21/8146
See application file for complete search history.

(56) References Cited

U.S. PATENT DOCUMENTS 9,239,949 B2 1/2016 Jung et al.
9,292,955 B1 3/2016 Haase et al.
(Continued)

FOREIGN PATENT DOCUMENTS

JP 2012-120098 A 6/2012
JP 6622440 B1 12/2019
(Continued)

OTHER PUBLICATIONS

Japanese Office Action issued Sep. 26, 2023, in corresponding Japanese Patent Application No. 2020-080004, 9pp.

*Primary Examiner* — Fernando Alcon
(74) *Attorney, Agent, or Firm* — XSENSUS LLP

(57) ABSTRACT

A video distribution device includes processing circuitry configured to receive first information, from a first terminal device, corresponding to motion of a first user of the first terminal device; distribute second information to a second terminal device of a second user being different from the first user, the second information for displaying a video including a first character object generated based on the first information; receive, from a second terminal device in a case that a second terminal device displays the video, a request for a first gift for the first character object; and distribute, to a second terminal device in response to a request, third information for displaying video that includes the first character object and a first object corresponding to a first gift.

20 Claims, 13 Drawing Sheets

(51) Int. Cl.
*H04N 21/4784* (2011.01)
*H04N 21/6543* (2011.01)
*H04N 21/658* (2011.01)
*H04N 21/81* (2011.01)

(52) U.S. Cl.
CPC ....... *H04N 21/6543* (2013.01); *H04N 21/658* (2013.01); *H04N 21/8146* (2013.01)

(56) References Cited

U.S. PATENT DOCUMENTS

| | | | |
|---|---|---|---|
| 9,465,435 B1* | 10/2016 | Zhang | H04N 21/8549 |
| 10,657,695 B2 | 5/2020 | Chand et al. | |
| 10,659,405 B1 | 5/2020 | Chang et al. | |
| 10,680,980 B2 | 6/2020 | Curry et al. | |
| 10,708,545 B2 | 7/2020 | Rivard et al. | |
| 10,761,680 B2 | 9/2020 | Lee et al. | |
| 10,796,480 B2 | 10/2020 | Chen et al. | |
| 11,003,322 B2 | 5/2021 | Tran et al. | |
| 11,108,721 B1 | 8/2021 | Roberts et al. | |
| 11,140,360 B1 | 10/2021 | Kasaba | |
| 11,159,922 B2 | 10/2021 | Ciechanowski et al. | |
| 11,178,335 B2 | 11/2021 | Van Os et al. | |
| 11,221,751 B2 | 1/2022 | Chaudhri et al. | |
| 11,223,771 B2 | 1/2022 | Manzari et al. | |
| 11,432,052 B1* | 8/2022 | Furlotti | G06Q 30/0276 |
| 2013/0080578 A1* | 3/2013 | Murad | G06Q 30/0241 709/217 |
| 2013/0283301 A1* | 10/2013 | Avedissian | H04N 21/4223 725/5 |
| 2015/0230005 A1 | 8/2015 | Choi et al. | |
| 2015/0287403 A1 | 10/2015 | Holzer Zaslansky et al. | |
| 2015/0334075 A1 | 11/2015 | Wang et al. | |
| 2016/0277802 A1 | 9/2016 | Bernstein et al. | |
| 2017/0006322 A1 | 1/2017 | Dury et al. | |
| 2017/0230321 A1 | 8/2017 | Bruns et al. | |
| 2017/0289619 A1* | 10/2017 | Xu | H04N 21/25866 |
| 2017/0323266 A1 | 11/2017 | Seo | |
| 2017/0336960 A1 | 11/2017 | Chaudhri et al. | |
| 2018/0067641 A1 | 3/2018 | Lemer et al. | |
| 2018/0083901 A1 | 3/2018 | McGregor, Jr. et al. | |
| 2018/0091732 A1 | 3/2018 | Wilson et al. | |
| 2018/0335928 A1 | 11/2018 | Van Os et al. | |
| 2018/0335930 A1 | 11/2018 | Scapel et al. | |
| 2019/0102929 A1 | 4/2019 | David et al. | |
| 2020/0234481 A1 | 6/2020 | Scapel et al. | |
| 2020/0412975 A1 | 12/2020 | Al Majid et al. | |
| 2021/0005003 A1 | 1/2021 | Chong et al. | |
| 2021/0065421 A1* | 3/2021 | Kurabuchi | H04N 21/23412 |
| 2021/0065454 A1 | 3/2021 | Goodrich et al. | |
| 2021/0168108 A1 | 6/2021 | Antmen et al. | |
| 2021/0192852 A1 | 6/2021 | Holmes | |
| 2021/0225059 A1 | 7/2021 | Ramamurthy et al. | |
| 2021/0314668 A1 | 10/2021 | Fu et al. | |
| 2021/0344991 A1 | 11/2021 | Todd | |
| 2022/0070513 A1 | 3/2022 | Shirai et al. | |
| 2022/0083126 A1 | 3/2022 | Iwaki | |
| 2022/0345754 A1* | 10/2022 | Pollock | H04N 21/2668 |
| 2023/0222466 A1* | 7/2023 | Herring | H04N 21/4788 715/719 |

FOREIGN PATENT DOCUMENTS

| | | |
|---|---|---|
| JP | 6644928 B1 | 2/2020 |
| WO | 2019/216249 A1 | 11/2019 |

* cited by examiner

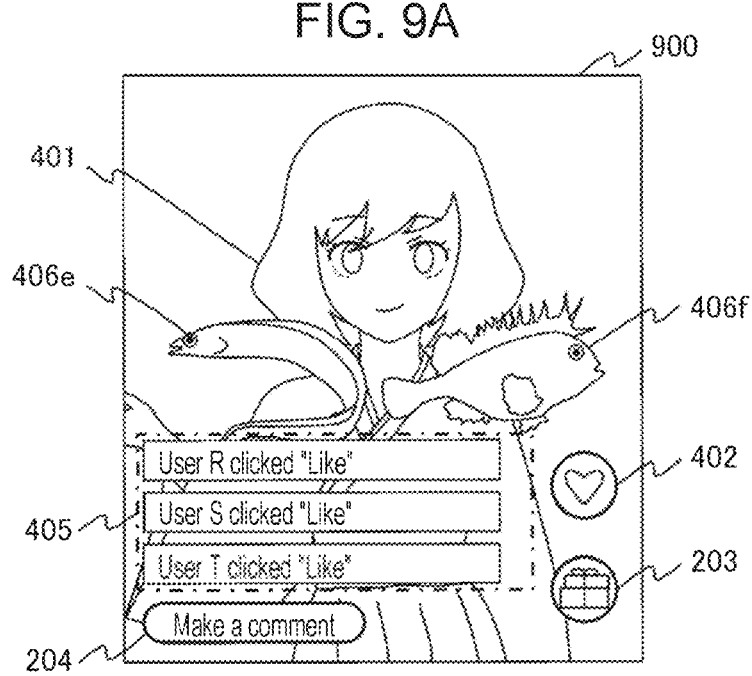
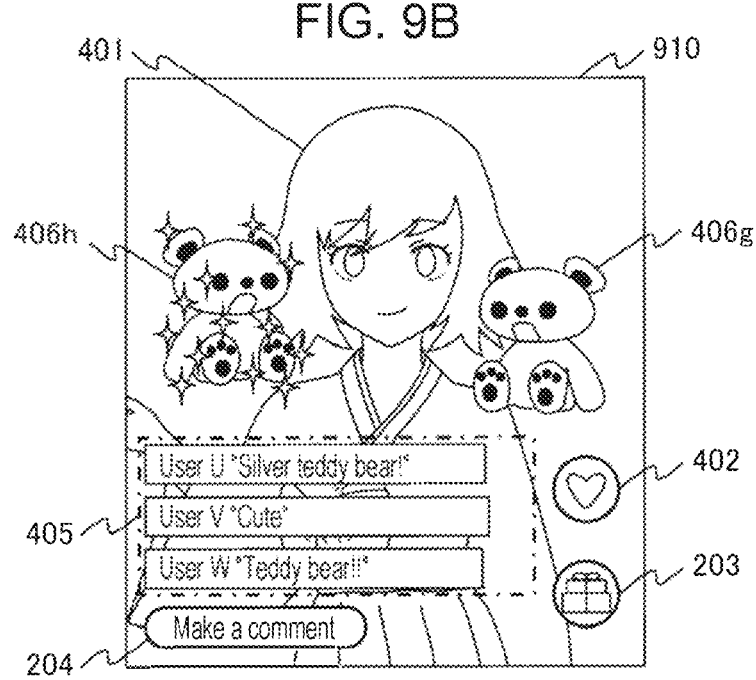

| USER ID | NAME | CHARACTER OBJECT | POSSESSED OBJECT | ... |
|---|---|---|---|---|
| U-00000001 | USER A | C-00000001 | Obj-0004, Obj-0028, ... | ... |
| U-00000002 | USER B | C-00000002 | Obj-0021, Obj-0055, ... | ... |
| ... | ... | ... | ... | ... |

| OBJECT ID | IMAGE INFORMATION | DEGREE OF RARITY | LOCATION OF PLACEMENT | ... |
|---|---|---|---|---|
| Obj-0001 | 0001.pmg | SR | SPACE | ... |
| Obj-0002 | 0002.pmg | R | HEAD | ... |
| ... | ... | ... | ... | ... |

| USER ID | POINTS | USED COINS | ... |
|---|---|---|---|
| U-00000001 | 3200 | 5500 | ... |
| U-00000002 | 8500 | 10200 | ... |
| ... | ... | ... | ... |

| SELECTION PROBABILITY ID | DEGREE OF RARITY (SR) | DEGREE OF RARITY (R) | DEGREE OF RARITY (N) | ... |
|---|---|---|---|---|
| L-01 | 5 % | 15 % | 25 % | ... |
| L-02 | 8 % | 17 % | 20 % | ... |
| ... | ... | ... | ... | ... |

VIDEO DISTRIBUTION DEVICE, VIDEO DISTRIBUTION METHOD, AND VIDEO DISTRIBUTION PROCESS

CROSS-REFERENCE TO RELATED APPLICATIONS

The present application is a continuation of U.S. application Ser. No. 17/244,956, filed on Apr. 30, 2021, which claims priority to JP 2020-080004, filed in Japan on Apr. 30, 2020, the content of both of which is incorporated by reference in its entirety.

TECHNICAL FIELD

Embodiments disclosed herein relate to a video distribution device, a video distribution method and video distribution process.

BACKGROUND ART

There exist video distribution systems that distribute distribution data including video data, etc. to one or more terminal devices. In recent video distribution systems, a technique is employed in which in response to an operation performed on a terminal device by a viewer who has viewed a distribution screen based on distribution data, a specific object, a comment, and so on are provided to a distributor who is a creator of video data.

For example, a conventional video distribution system distributes to one or more terminal devices, distribution data for simultaneously displaying video data from a distributor and image data indicating an item provided by a viewer. In this video distribution system, the viewer can view not only the image data indicating the item provided by the viewer but also image data indicating an item provided by another viewer together with the video data from the distributor.

However, in an existing video distribution system, all images showing objects that are, for example, items provided by viewers are uniformly displayed. Therefore, even an image showing an object provided by a viewer who is deeply involved in the video distribution system is submerged in images showing objects provided by the other viewers, and the motivation of the viewer to participate in a distribution event may decrease.

Further, in an existing video distribution system, an image showing an object that is, for example, an item provided by a viewer is displayed without any change in display regardless of whether the image is displayed together with video data from a distributor who is actively involved in the video distribution system or the image is displayed together with video data from a distributor who is not actively involved in the video distribution system. Accordingly, each distributor has difficulty in differentiating themselves from the other distributors, and the motivation of the distributor to distribute may decrease.

Further, in an existing video distribution system, an image showing an object from a viewer having a strong relationship with a distributor and an image showing an object provided by another viewer having a weak relationship with the distributor are displayed in the same manner as long as the images are of the same type. Accordingly, even when the distributor and the viewer strengthen their relationship, video display is not affected, and therefore, their motivation for involvement in the video distribution system may decrease.

SUMMARY

In an exemplary implementation of the present disclosure, a video distribution device includes processing circuitry configured to receive first information, from a first terminal device, corresponding to motion of a first user of the first terminal device; distribute second information to a second terminal device of a second user being different from the first user, the second information for displaying a video including a first character object generated based on the first information; receive, from a second terminal device in a case that a second terminal device displays the video, a request for a first gift for the first character object; and distribute, to a second terminal device in response to a request, third information for displaying video that includes the first character object and a first object corresponding to a first gift. Third information further includes information for changing display of the first object based on first user information of the first user or second user information of a second user that sends the request for a first gift.

BRIEF DESCRIPTION OF THE DRAWINGS

FIGS. 9A and 9B are diagrams each illustrating an example screen displayed on the display device of the terminal device;

FIGS. 10A to 10D are diagrams illustrating example data structures of tables T1 to T4 respectively;

DETAILED DESCRIPTION OF THE DRAWINGS

Figure 1:
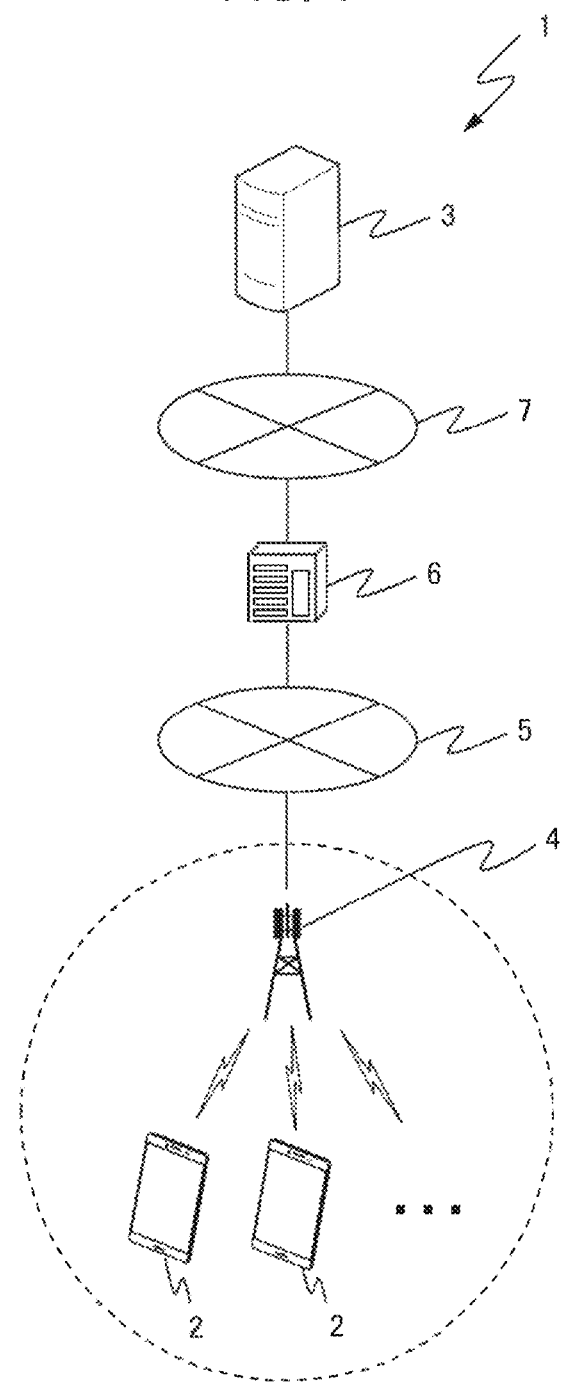
FIG. 1 is a diagram schematically illustrating an example configuration of a video distribution system.

In accordance with an exemplary implementation of the present disclosure, a video distribution device is a video distribution device for distributing a video that includes a character object generated on the basis of motion of a user, the video distribution device including one or more processors. The one or more processors are configured to: distribute information for displaying a video that includes a first character object generated on the basis of motion of a first user to a terminal device of at least one user different from the first user; and distribute, in accordance with a display request for a first gift for the first character object transmitted from a terminal device that displays the video, the information for displaying the video that further includes a first object corresponding to the first gift to the terminal device of the at least one user. The information for displaying the video includes information for changing display of the first object on the basis of information about the first user or information about a user who makes the display request for the first gift.

Further, in the video distribution device, preferably, the display of the first object is changed on the basis of information about the number of display requests for the first gift for the first character object transmitted from the terminal device of the at least one user.

Further, in the video distribution device, preferably, the display of the first object is changed on the basis of the number of users associated with the first user.

Further, in the video distribution device, preferably, the one or more processors are configured to further distribute, in accordance with a display request for input information concerning the first character object transmitted from the terminal device of the at least one user, the information for displaying the video that further includes the input information to the terminal device of the at least one user, and the display of the first object is changed on the basis of information about the number of display requests for the input information.

Further, in the video distribution device, preferably, the terminal device of the user making the display request for the first gift is allowed to transmit a display request for input information concerning a character object generated on the basis of motion of another user, and the display of the first object is changed on the basis of information about the number of display requests for input information transmitted from the terminal device of the user making the display request for the first gift.

Further, in the video distribution device, the input information is text information or evaluation information concerning the character object.

Further, in the video distribution device, the one or more processors are configured to further determine whether the information for displaying the video is distributed in each of a plurality of consecutive periods, and the display of the first object is changed on the basis of information about the number of consecutive periods in each of which the information for displaying the video is distributed.

Further, in the video distribution device, the one or more processors are configured to further count the number of terminal devices to which the information for displaying the video is transmitted, and the display of the first object is changed on the basis of the counted number of terminal devices.

Further, in the video distribution device, in changing of the display of the first object, after an elapse of a predetermined time since a start of distribution of the video including the first object, the information for displaying the video that further includes a second object based on the information about the first user or the information about the user making the display request for the first gift is distributed to the terminal device of the at least one user.

Further, in the video distribution device, the one or more processors are configured to further: distribute information for displaying a video that includes at least the first character object and a second character object generated on the basis of motion of a second user to a terminal device of at least one third user different from the first user and the second user; distribute, in accordance with a display request for the first gift for one of the first character object or the second character object transmitted from a terminal device that displays the video, the information for displaying the video that further includes the first object corresponding to the first gift to the terminal device of the at least one third user; and in a case where the video includes the first object for the first character object and the first object for the second character object, determine a ranking of the first user and a ranking of the second user on the basis of the number of points associated with the second object for the first character object and the number of points associated with the second object for the second character object.

Further, in the video distribution device, the one or more processors are configured to give at least one of the first user or the second user a bonus on the basis of the number of points associated with the second object for the first character object and the number of points associated with the second object for the second character object.

In accordance with an exemplary implementation of the present disclosure, a video distribution method is a video distribution method for a video distribution device for distributing a video that includes a character object generated on the basis of motion of a user, the video distribution device including one or more processors. The one or more processors are configured to: distribute information for displaying a video that includes a first character object generated on the basis of motion of a first user to a terminal device of at least one user different from the first user; and distribute, in accordance with a display request for a first gift for the first character object transmitted from a terminal device that displays the video, the information for displaying the video that further includes a first object corresponding to the first gift to the terminal device of the at least one user. The information for displaying the video includes information for changing display of the first object on the basis of information about the first user or information about a user who makes the display request for the first gift.

In accordance with an exemplary implementation of the present disclosure, a video distribution process is a video distribution process for a video distribution device for distributing a video that includes a character object generated on the basis of motion of a user, the video distribution device including one or more processors. The video distribution process causes the one or more processors to: distribute information for displaying a video that includes a first character object generated on the basis of motion of a first user to a terminal device of at least one user different from the first user; and distribute, in accordance with a display request for a first gift for the first character object transmitted from a terminal device that displays the video, the information for displaying the video that further includes a first object corresponding to the first gift to the terminal device of the at least one user. The information for displaying the video includes information for changing display of the first object on the basis of information about the first user or information about a user who makes the display request for the first gift.

In accordance with an exemplary implementation of the present disclosure, a video distribution method is a video distribution method for a video distribution system having a server device distributing a video that includes a character object generated on the basis of motion of a user and having terminal devices respectively possessed by a plurality of users. A terminal device possessed by a first user among the plurality of users is configured to generate a first character object on the basis of motion of the first user, and transmit information for displaying a video that includes the generated first character object to the server device. The server device is configured to receive the information for displaying the video that includes the first character object from the terminal device possessed by the first user, and distribute the received information to a terminal device of at least one user different from the first user. The terminal device of the at least one user is configured to display the video on the basis of the information received from the server device, and transmit a display request for a first gift for the first character object included in the displayed video to the server device. The server device is configured to distribute, in accordance with the display request transmitted from a terminal device that displays the video, the information for displaying the video that further includes a first object corresponding to the first gift to the terminal device of the at least one user. The information for displaying the video includes information for changing display of the first object on the basis of information about the first user or information about a user who makes the display request for the first gift.

With the video distribution device, the video distribution method, and the video distribution process, a motivation of a distributor and/or a viewer for involvement in video distribution may be increased.

Hereinafter, various embodiments of the present disclosure will be described with reference to the drawings. It should be noted that the technical scope of the present invention is not limited to the embodiments and extends over features stated in the claims and their equivalents.

Distribution System 1

FIG. 1 is a diagram schematically illustrating an example configuration of a video distribution system 1. The video distribution system 1 includes terminal devices 2 respectively operated by a plurality of users and a server device 3. Each terminal device 2 and the server device 3 are connected to each other via, for example, a base station 4, a mobile communication network 5, a gateway 6, and a communication network, such as the Internet 7. Communication is performed between each terminal device 2 and the server device 3 on the basis of a predetermined communication protocol. The predetermined communication protocol is, for example, the Hypertext Transfer Protocol (HTTP).

Each terminal device 2 is an information processing device, such as a smartphone. Each terminal device 2 may be, for example, a mobile phone, a tablet terminal, a tablet personal computer (PC), an electronic book reader, or a wearable computer. Each terminal device 2 may be a portable game machine, a game console, or a notebook PC. Each terminal device 2 may be any information processing device as long as the terminal device 2 is capable of generating video data based on captured image data and/or reproducing video data. The terminal device 2 is a type of video distribution device.

In the example illustrated in FIG. 1, one server device 3 is illustrated as a constituent element of the video distribution system 1; however, the server device 3 may be an aggregate of a plurality of physically separated server devices. In this case, the plurality of server devices may have the same functions, or the functions of one server device 3 may be distributed among the plurality of server devices. The server device 3 is a type of video distribution device.

Terminal Device 2

Figure 2:
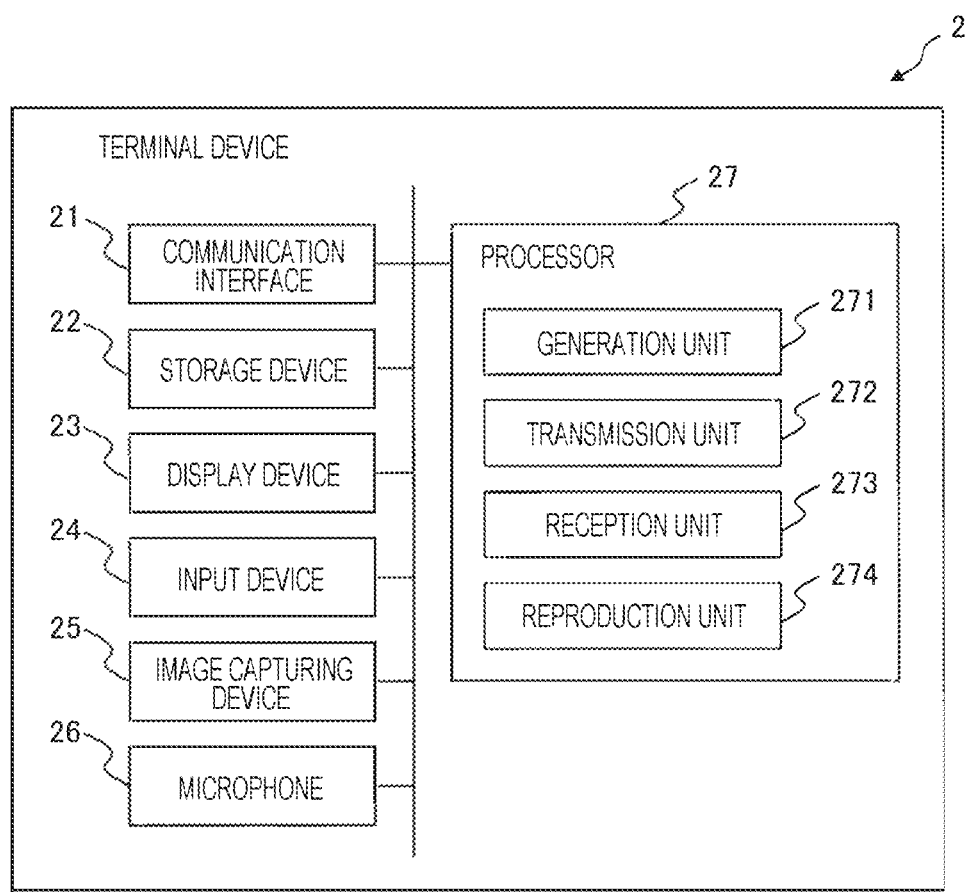
FIG. 2 is a diagram schematically illustrating an example configuration of a terminal device.

FIG. 2 is a diagram schematically illustrating an example configuration of the terminal device 2.

The terminal device 2 is connected to the server device 3 via the base station 4, the mobile communication network 5, the gateway 6, and the Internet 7 and communicates with the server device 3. The terminal device 2 generates motion data, etc. on the basis of various types of data (captured image data, etc.) input by the user and transmits the generated data to the server device 3. The terminal device 2 receives distribution data distributed from the server device 3 and displays, for example, a distribution screen on the basis of the received distribution data. To implement these functions, the terminal device 2 includes a communication interface 21, a storage device 22, a display device 23, an input device 24, an image capturing device 25, a microphone 26, and a processor 27.

Hereinafter, a user who uses at least the function of generating motion data may be referred to as a distributing user, and a user who uses at least the function of displaying a distribution screen based on distribution data may be referred to as a viewing user. Note that a user can be a distributing user and a viewing user.

The communication interface 21 is implemented as hardware, firmware, or communication software, such as a Transmission Control Protocol/Internet Protocol (TCP/IP) driver or a Point-to-Point Protocol (PPP) driver, or a combination thereof. The terminal device 2 can transmit data to other devices and receive data from other devices via the communication interface 21.

The storage device 22 is, for example, a semiconductor memory device including a read-only memory (ROM) and a random access memory (RAM). The storage device 22 stores an operating system program, a driver program, an application program, data, etc. used in processing by the processor 27.

The driver program stored in the storage device 22 includes an output device driver program for controlling the display device 23 and an input device driver program for controlling the input device 24. The application program stored in the storage device 22 includes a control program for generating motion data described below and reproducing distribution data from the server device 3. The data stored in the storage device 22 includes identification information (for example, a user identification (ID)) for uniquely identifying the user. As the data, the storage device 22 stores model data, background data, etc. described below. Further, as the data, the storage device 22 stores a user table T1, an object table T2, an activity table T3, and a selection probability table T4 described below. The storage device 22 may temporarily store data related to a specific process. Note that the control program may be a program transmitted from the server device 3 or other devices.

The background data is asset data for creating a virtual space in which a moving image on a distribution screen displayed on the basis of distribution data is formed. The background data includes data for drawing the background of the virtual space, data for drawing various objects included in the distribution screen, and data for drawing various background objects, other than the background and the objects, displayed on the distribution screen. The background data may include object position information that indicates the positions of various background objects in the virtual space.

The display device 23 is a liquid crystal display. Note that the display device 23 may be, for example, an organic electro-luminescence (EL) display. The display device 23 displays a moving image corresponding to moving image data supplied from the processor 27, a still image corresponding to still image data supplied therefrom, etc.

The input device 24 is a pointing device, such as a touch panel. The touch panel can detect various touch operations including tapping, double tapping, and dragging by the user. The touch panel may include a capacitive proximity sensor so as to be capable of detecting a non-contact operation by the user. Note that the input device 24 may be, for example, input keys. The user can input characters, numerals, and symbols or, for example, a position on the display screen of the display device 23 by using the input device 24. In response to an operation by the user, the input device 24 generates a signal corresponding to the operation. The input device 24 supplies the generated signal to the processor 27 as a user instruction.

The image capturing device 25 is a camera having an image forming optical system, an image sensor, an image processing unit, etc. The image forming optical system is, for example, an optical lens and forms an image on the image capturing surface of the image sensor from light rays from a subject. The image sensor is, for example, a charge-coupled device (CCD) sensor or a complementary metal-oxide semiconductor (CMOS) sensor and outputs an image of the subject formed on the image capturing surface. The image processing unit creates moving image data in a predetermined file format from images successively generated by the image sensor every predetermined period and outputs the moving image data as captured image data. The image processing unit creates still image data in a predetermined file format from an image generated by the image sensor and outputs the still image data as captured image data.

The microphone 26 is a sound collecting device configured to pick up a sound uttered by the user and converts the sound to sound data. The microphone 26 is configured to be capable of receiving sound input from the user. Sound input from the user received by the microphone 26 is converted to sound data, and the sound data is transmitted to the server device 3 via the communication interface 21.

The processor 27 is a processing device that loads the operating system program, the driver program, and the application program stored in the storage device 22 to a memory and executes instructions included in the loaded programs. The processor 27 is, for example, an electronic circuit, such as a central processing unit (CPU), a micro-processing unit (MPU), a digital signal processor (DSP), or a graphics processing unit (GPU), or a combination of various electronic circuits. The processor 27 may be implemented as an integrated circuit, such as an application-specific integrated circuit (ASIC), a programmable logic device (PLD), a field-programmable gate array (FPGA), or a micro-controller unit (MCU). The processor 27 may also be encompassed by or compare control circuitry and/or processing circuitry. In FIG. 2, the processor 27 is illustrated as a single constituent element; however, the processor 27 may be an aggregate of a plurality of physically separated processors. Additional structural configuration of the terminal device 2, including processor 27, is described below with respect to FIG. 13.

The processor 27 executes various instructions included in the control program to thereby function as a generation unit 271, a transmission unit 272, a reception unit 273, and a reproduction unit 274.

Generation Unit 271

Figure 3A:
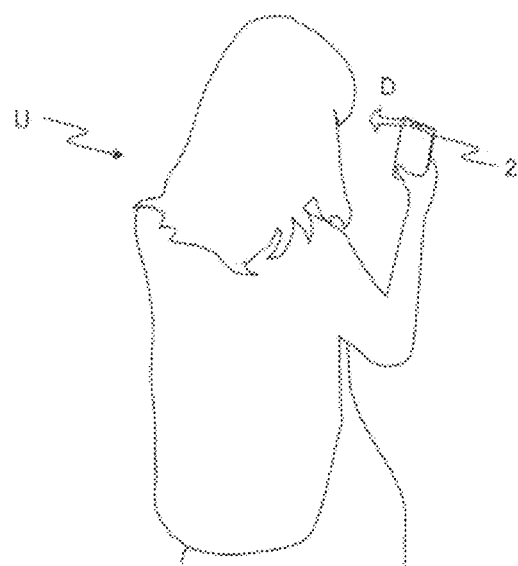
FIG. 3A is a perspective view of an example user operating the terminal device.
Figure 3B:
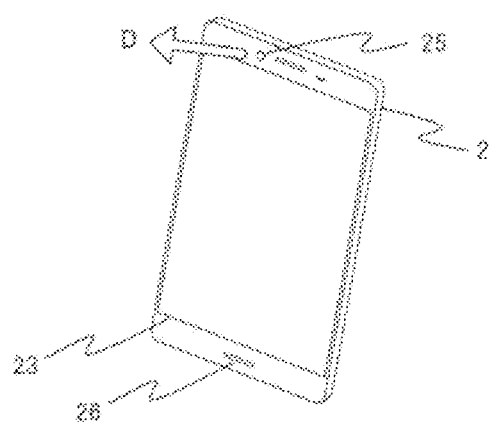
FIG. 3B is a perspective view of an example of the terminal device.

Example functions of the generation unit 271 are described below with reference to FIGS. 3A and 3B. As illustrated in FIGS. 3A and 3B, the image capturing device 25 of the terminal device 2 held by a distributing user U is disposed on the terminal device 2 such that, for example, the face of the distributing user U watching the display screen of the display device 23 is in the image capturing direction D. The image capturing device 25 successively captures images of the face of the distributing user U in the image capturing direction D and obtains and outputs to the processor 27 pieces of captured image data of the face of the distributing user U. The image capturing device 25 may capture an image of a part of the distributing user U other than the face, such as the head, arms, hands (including fingers), chest, trunk, legs, or any other part to obtain captured image data. The image capturing device 25 may be a 3D camera capable of detecting the depth of the face of a person.

The generation unit 271 generates, on the basis of the pieces of captured image data successively output from the image capturing device 25, face motion data that is a digital representation of the motion of the face of the distributing user U over time as necessary. The face motion data may be generated at predetermined sampling time intervals. The face motion data thus generated by the generation unit 271 can digitally represent the motion of the face of the distributing user U (changes in their facial expression) in a time-series manner.

The generation unit 271 may generate body motion data that is a digital representation of the position and orientation of each part (head, arms, hands (including fingers), chest, trunk, legs, or parts other than these parts) of the distributing user U together with the face motion data or separately from the face motion data.

The body motion data may be generated on the basis of detection information from a widely available motion sensor put on the distributing user U. In this case, the communication interface 21 of the terminal device 2 has a specific communication circuit for receiving the detection information from the motion sensor put on the distributing user U through wireless communication. The generation unit 271 generates body motion data on the basis of the detection information received via the communication interface 21. The body motion data may be generated at predetermined sampling time intervals.

The body motion data thus generated by the generation unit 271 can digitally represent the motion of the body of the distributing user U in a time-series manner.

Generation of the body motion data based on the detection information from the motion sensor put on the distributing user U may be performed in, for example, an image capturing studio. In this case, a base station, a tracking sensor, and a display may be provided in the image capturing studio. The base station is, for example, a multi-axis laser emitter. The motion sensor put on the distributing user U may be, for example, VIVE Tracker available from HTC Corporation. The base station may be, for example, any base station available from HTC Corporation.

In a separate room adjacent to the image capturing studio, a supporter computer may be installed. The display in the image capturing studio may be configured to display information received from the supporter computer. The server device 3 may be installed in the room in which the supporter computer is installed. The room in which the supporter computer is installed and the image capturing studio may be separated from each other by a glass window. In this case, the operator of the supporter computer can visually recognize the distributing user. The supporter computer may be configured to be capable of changing settings of various devices provided in the image capturing studio in accordance with an operation by the operator. The supporter computer can, for example change the setting of intervals at which the base station performs a scan, the settings of the tracking sensor, and various settings of the other devices. The operator may input a message to the supporter computer, and the input message may be displayed on the display in the image capturing studio.

Transmission Unit 272

The transmission unit 272 transmits face motion data and/or body motion data generated by the generation unit 271 to the server device 3 via the communication interface 21 together with the distributing user ID stored in the storage device 22. Hereinafter, face motion data and body motion data may be collectively referred to as motion data.

The transmission unit 272 transmits sound data of the distributing user U obtained by the microphone 26 to the server device 3 via the communication interface 21 in real time. Note that the sound data may be transmitted to the server device 3 in synchronization with the motion data.

The transmission unit 272 transmits to the server device 3 via the communication interface 21, a display request for displaying on a distribution screen, response information input by the distributing user U operating the input device 24 and a display request for displaying on a distribution screen, a gift object corresponding to gift object information described below. The display requests each include the distributing user ID stored in the storage device 22. The response information will be described in detail below. Further, the transmission unit 272 transmits to the server device 3 via the communication interface 21 an end request for giving an instruction for terminating video distribution. The end request includes the distributing user ID stored in the storage device 22.

Reception Unit 273

The reception unit 273 receives distribution data transmitted from the server device 3 via the communication interface 21. The distribution data is, for example, distribution data that at least includes motion data concerning a distributing user and the user ID of the distributing user or is distribution data that includes various display requests. The distribution data will be described in detail below.

Reproduction Unit 274

The reproduction unit 274 generates drawing data for displaying a distribution screen on the basis of motion data generated by the generation unit 271 and/or distribution data received by the reception unit 273 and displays the distribution screen on the display device 23 on the basis of the generated drawing data.

Examples of Various Screens

Examples of various screens displayed on the display device 23 of the terminal device 2 of a distributing user and that of a viewing user are described below with reference to FIG. 4A to FIG. 9B.

Figure 4A:
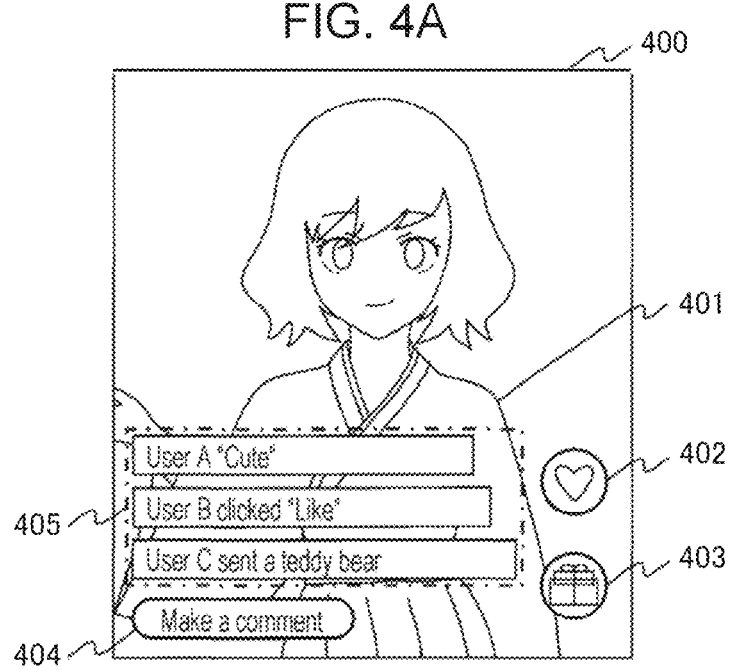
FIGS. 4A and 4B are diagrams each illustrating an example screen displayed on a display device of the terminal device.

FIG. 4A is a diagram illustrating an example of a distribution screen 400 displayed on the display device 23. The distribution screen 400 includes a character object 401, an evaluation button 402, a gift button 403, a comment button 404, and a response information display area 405.

The terminal device 2 of a distributing user simultaneously performs a process for transmitting motion data, etc. by the transmission unit 272 and a process for displaying the distribution screen 400 by the reproduction unit 274 at the start of video distribution. Video distribution starts in response to the distributing user selecting a specific video distribution start button displayed on the display device 23 of the terminal device 2 of the distributing user.

The terminal device 2 of a viewing user receives from the server device 3 information indicating one or more distributing users who are currently distributing and displays a video selection screen for selection from among the one or more distributing users who are currently distributing. Next, the terminal device 2 of the viewing user transmits to the server device 3 a viewing start request that includes information indicating a distributing user selected on the video selection screen in accordance with an operation performed on the input device 24 by the viewing user. The terminal device 2 of the viewing user receives from the server device 3 distribution data concerning the distributing user indicated by the information included in the viewing start request and displays the distribution screen 400 on the basis of the received distribution data. The server device 3 registers (stores in a storage device 32) the viewing user of the terminal device 2 that has transmitted the viewing start request as a viewing user who is currently viewing. The terminal device 2 of the viewing user transmits to the server device 3 a viewing end request in accordance with an operation performed on the input device 24 by the viewing user to thereby terminate reception of distribution data and terminate display of the distribution screen 400. The server device 3 cancels registration, as a viewing user who is currently viewing, of the viewing user of the terminal device 2 that has transmitted the viewing end request.

The character object 401 is an object image generated on the basis of motion data of the distributing user. In a case where the motion data includes face motion data, the facial expression of the character object 401 changes in synchronization with the motion of the face of the distributing user. In a case where the motion data includes body motion data, a corresponding part of the character object 401 moves in synchronization with the motion of the body of the distributing user.

The evaluation button 402 is an object image for giving an instruction for transmitting evaluation data concerning the distribution screen 400, etc. In a case where the input device 24 is a touch panel, the evaluation button 402 is selected in response to the viewing user performing a tap operation on the display area of the evaluation button 402. The evaluation button 402 need not be displayed on the terminal device 2 of the distributing user. In response to the viewing user who is viewing the distribution screen 400 selecting the evaluation button 402, the transmission unit 272 transmits to the server device 3 via the communication interface 21 evaluation data indicating that "positive evaluation of the distribution screen 400" has been made or evaluation data indicating that "positive evaluation of the character object 401 included in the distribution screen 400" has been made. The server device 3 may transmit the received evaluation data to the terminal device 2 of the distributing user.

Note that the evaluation button 402 may be an object image for giving an instruction for transmitting evaluation data indicating that "negative evaluation of the distribution screen 400" has been made or evaluation data indicating that "negative evaluation of the character object 401 included in the distribution screen 400" has been made. Further, the distribution screen 400 may include a plurality of types of evaluation buttons 402 (for example, two types of evaluation buttons including an evaluation button for transmitting positive evaluation data and an evaluation button for transmitting negative evaluation data).

In a case where a plurality of viewing users are viewing the distribution screen 400, aggregate information obtained by aggregating pieces of evaluation data transmitted from the terminal devices 2 of the viewing users may be included in the distribution screen 400. For example, the server device 3 may count the number of pieces of evaluation data transmitted from the terminal devices 2 of the plurality of viewing users and include the number of pieces of evaluation data in the distribution screen 400. The aggregate information need not be the number of pieces of evaluation data and may be, for example, information about a time period in which evaluation data has been transmitted. The period of aggregation is, for example, a period from the start of distribution of the distribution screen 400 to the current time or a predetermined period (for example, a period from 21:00 to 24:00). Further, a plurality of periods of aggregation may be set. In a case where received pieces of evaluation data are transmitted to the terminal device 2 of the distributing user, aggregation of the pieces of evaluation data may be performed by the terminal device 2 of the distributing user. In this case, a process for including the aggregate information in the distribution screen 400 may be performed by the terminal device 2 of the distributing user.

The gift button 403 is an object image for giving an instruction for displaying a selection screen 410 that is for selecting a gift object to be displayed on the distribution screen 400. In the case where the input device 24 is a touch panel, the gift button 403 is selected in response to the viewing user performing a tap operation on the display area of the gift button 403. In response to the viewing user who is viewing the distribution screen 400 selecting the gift button 403, the selection screen 410 is displayed. The selection screen 410 will be described in detail below. The gift button 403 need not be displayed on the terminal device 2 of the distributing user.

The comment button 404 is an object image for giving an instruction for displaying a comment input window that is for inputting a comment (character string) to be displayed on the distribution screen 400. In the case where the input device 24 is a touch panel, the comment button 404 is selected in response to the viewing user performing a tap operation on the display area of the comment button 404. In response to the viewing user who is viewing the distribution screen 400 selecting the comment button 404, the comment input window is superimposed on the distribution screen 400 and displayed. The comment button 404 need not be displayed on the terminal device 2 of the distributing user.

The comment input window is displayed only on the display device 23 of the terminal device 2 of the viewing user who has selected the comment button 404, and the comment input window or a character string that is being input to the comment input window is not displayed on the display device 23 of the terminal device 2 of any other viewing user. Comment data indicating a comment (character string) input to the comment input window by the viewing user operating the input device 24 is transmitted by the transmission unit 272 to the server device 3 via the communication interface 21.

The response information display area 405 includes information about comment data, evaluation data, and/or a gift object transmitted from the terminal device 2 of each viewing user who is viewing the distribution screen 400. Hereinafter, information about comment data, evaluation data, and/or a gift object may be collectively referred to as response information.

An example of the response information display area 405 illustrated in FIG. 4A shows that the terminal device 2 of a viewing user having a name "user A" has transmitted comment data indicating a comment "cute", the terminal device 2 of a viewing user having a name "user B" has transmitted evaluation data, and a gift object "teddy bear" has been selected by the terminal device 2 of a viewing user having a name "user C".

The server device 3 receives a display request for response information from the terminal device 2 of a viewing user who is viewing the distribution screen 400 and transmits distribution data including the response information to the terminal devices 2 of the other viewing users other than the terminal device 2 that has transmitted the display request. The reproduction unit 274 of the terminal device 2 of each viewing user who is viewing the distribution screen 400 displays the distribution screen 400 in which the response information included in the distribution data transmitted from the server device 3 and response information transmitted to the server device 3 from the terminal device 2 of the viewing user are put in chronological order and included in the response information display area 405. The server device 3 transmits distribution data including pieces of response information from the terminal devices 2 of viewing users to the terminal device 2 of the distributing user, and the reproduction unit 274 of the terminal device 2 of the distributing user displays the distribution screen 400 in which the pieces of response information included in the distribution data transmitted from the server device 3 are put in chronological order and included in the response information display area 405.

Note that the server device 3 may generate distribution data obtained by putting pieces of response information from the terminal devices 2 of one or more viewing users who are viewing the distribution screen 400 in chronological order, that is, in the order in which the pieces of response information have been transmitted, and including the pieces of response information in the response information display area 405 of the distribution screen 400 and transmit the distribution data to the terminal device 2 of the distributing user and that of each viewing user.

The upper limit of the number of pieces of response information that can be displayed in the response information display area 405 may be set. In the example of the response information display area 405 illustrated in FIG. 4A, the upper limit of the number of pieces of response information that can be displayed is three. In a case where the number of pieces of response information to be displayed on each terminal device 2 exceeds the set upper limit, the terminal device 2 displays the distribution screen 400 in which the latest three pieces of response information are included in the response information display area 405 in order. Note that the server device 3 may generate distribution data obtained by including the latest three pieces of response information in the order in which the pieces of response information have been received in the response information display area 405 and transmit the distribution data to the terminal device 2 of each viewing user.

Note that a widely used scroll bar may be displayed adjacent to the response information display area 405. In this case, in response to the viewing user operating the scroll bar, pieces of response information older than the pieces of response information displayed in the response information display area 405 are displayed in the response information display area 405.

Figure 4B:
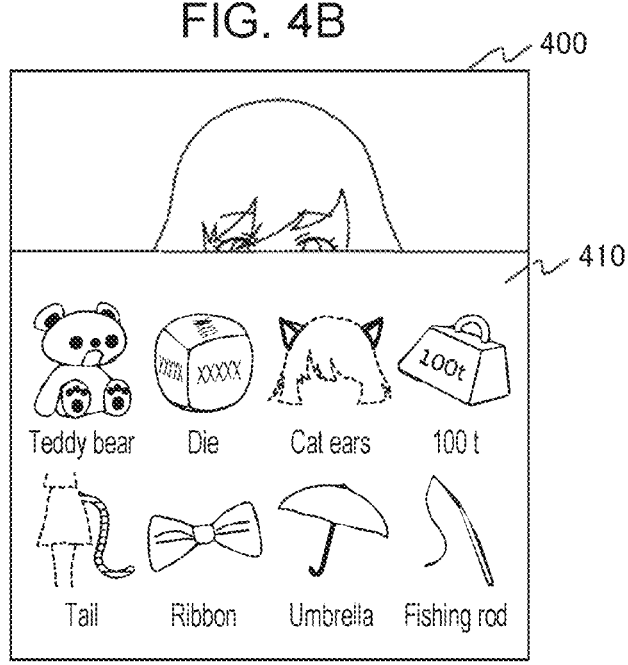

FIG. 4B is a diagram illustrating an example of the selection screen 410 displayed on the display device 23. The selection screen 410 illustrated in FIG. 4B is displayed so as to be superimposed on the distribution screen 400. The selection screen 410 may be displayed after the end of display of the distribution screen 400.

In the selection screen 410, images and/or names of one or more candidate objects are included. In the example illustrated in FIG. 4B, the images and names of eight types of candidate objects are displayed on the selection screen

410. The number of candidate objects to be displayed on the selection screen 410 is not limited to eight. Note that in a case where it is not possible to include some of the images showing a plurality of candidate objects within the selection screen 410, a widely used scroll bar may be included in the selection screen 410. In this case, in response to the viewing user operating the scroll bar, images showing candidate objects that are currently not displayed on the selection screen 410 scroll up and are displayed within the selection screen 410.

Each candidate object represents a gift object, and an image showing a candidate object is, for example, an icon image or a thumbnail image showing a gift object. Note that on the selection screen 410, candidate objects may be grouped into the categories of gift objects (free gift, paid gift, accessory, item for cheering, appeal, variety, etc.) and displayed. A gift object categorized as a paid gift (hereinafter also referred to as "paid gift object") is a gift object that can be purchased by a viewing user using a "coin" having a virtual monetary value. A gift object categorized as a free gift is a gift object that can be obtained by, for example, using points that can be obtained by viewing a distribution screen without spending a monetary value.

In the case where the input device 24 is a touch panel, a candidate object is selected in response to the viewing user performing a tap operation on the display area of the image and/or the name indicating the candidate object. In response to the viewing user selecting a candidate object, the transmission unit 272 sets information (for example, an object ID) that indicates the selected candidate object as gift object information and transmits to the server device 3 via the communication interface 21 a display request for displaying a gift object corresponding to the gift object information on a distribution screen. When the display request for the gift object from the terminal device 2 of the viewing user is thus transmitted to the server device 3, the gift object selected by the viewing user is given to the distributing user or to the character object 401 of the distributing user, and the given gift object is displayed on a distribution screen 500 described below.

Figure 5A:
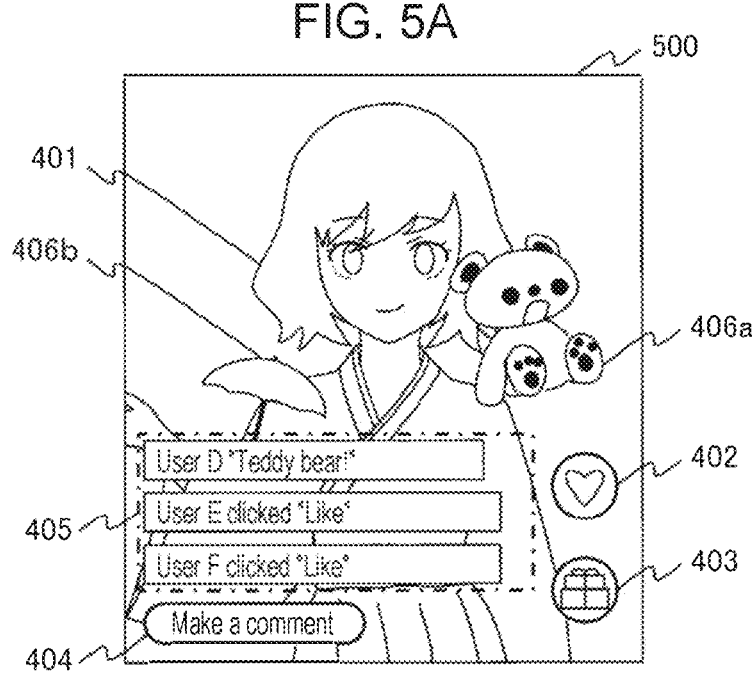
FIGS. 5A and 5B are diagrams each illustrating an example screen displayed on the display device of the terminal device.

FIG. 5A is a diagram illustrating an example of the distribution screen 500 displayed on the display device 23 after transmission of a display request for gift objects. The distribution screen 500 includes the character object 401, the evaluation button 402, the gift button 403, the comment button 404, and the response information display area 405 as in the distribution screen 400 illustrated in FIG. 4A. The distribution screen 500 further includes gift objects 406*a* and 406*b*.

The gift objects 406*a* and 406*b* in a case where the distribution screen 500 is a screen displayed by the terminal device 2 of the distributing user are described. The server device 3 receives a display request that includes gift object information (object IDs, etc.) from the terminal device 2 of a viewing user who is viewing the distribution screen 400 and transmits distribution data including the display request to the terminal device 2 of the distributing user. The reproduction unit 274 of the terminal device 2 of the distributing user displays the gift objects 406*a* and 406*b* that are object images corresponding to the gift object information included in the distribution data received from the server device 3 (the gift object information included in the display request).

The gift objects 406*a* and 406*b* in a case where the distribution screen 500 is a screen displayed by the terminal device 2 of a viewing user other than the terminal device 2 that has transmitted a display request are described. The server device 3 receives a display request that includes gift object information from the terminal device 2 of a viewing user who is viewing the distribution screen 400 and transmits distribution data including the display request to the terminal devices 2 of the other viewing users other than the terminal device 2 that has transmitted the display request. The reproduction unit 274 of the terminal device 2 of each of the viewing users displays the gift objects 406*a* and 406*b* that are object images corresponding to the gift object information included in the distribution data received from the server device 3 (the gift object information included in the display request).

In a case where the distribution screen 500 is a screen displayed by the terminal device 2 that has transmitted a display request including gift object information, the terminal device 2 displays the gift objects 406*a* and 406*b* that are object images corresponding to information indicating candidate objects selected by the viewing user who is operating the terminal device 2.

The gift objects 406*a* and 406*b* may be displayed on the distribution screen 500 for display periods (for example, 10 seconds and 15 seconds) set in advance for the respective gift objects. Further, the gift objects 406*a* and 406*b* that move along movement routes set in advance for the respective gift objects may be displayed.

Figure 5B:
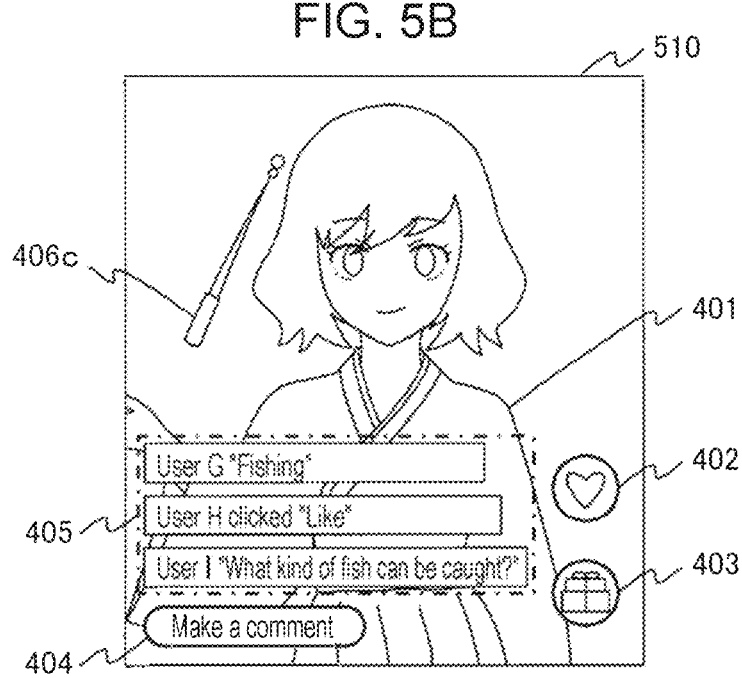

FIG. 5B is a diagram illustrating an example of a distribution screen 510 displayed on the display device 23 after transmission of a display request for a gift object. The distribution screen 510 includes the character object 401, the evaluation button 402, the gift button 403, the comment button 404, and the response information display area 405 as in the distribution screen 400 illustrated in FIG. 4A. The distribution screen 510 further includes a gift object 406*c*.

The gift object 406*c* in a case where the distribution screen 510 is a screen displayed by the terminal device 2 of the distributing user is described. The server device 3 receives a display request that includes gift object information (an object ID, etc.) from the terminal device 2 of a viewing user and transmits distribution data including the display request to the terminal device 2 of the distributing user. The reproduction unit 274 of the terminal device 2 of the distributing user displays the gift object 406*c* that is an object image corresponding to the gift object information included in the distribution data received from the server device 3 (the gift object information included in the display request). The gift object 406*c* is an object image that imitates a fishing rod in shape, and display of the gift object 406*c* changes as the display time passes. The gift object 406*c* is a type of usual object.

The gift object 406*c* in a case where the distribution screen 510 is a screen displayed by the terminal device 2 of a viewing user other than the terminal device 2 that has transmitted a display request is described. The server device 3 receives a display request that includes gift object information from the terminal device 2 of a viewing user and transmits distribution data including the display request to the terminal devices 2 of the other viewing users other than the terminal device 2 that has transmitted the display request. The reproduction unit 274 of the terminal device 2 of each of the viewing users displays the gift object 406*c* that is an object image corresponding to the gift object information included in the distribution data received from the server device 3 (the gift object information included in the display request).

In a case where the distribution screen 510 is a screen displayed by the terminal device 2 that has transmitted a display request including gift object information, the terminal device 2 displays the gift object 406*c* that is an object image corresponding to information indicating a candidate object selected by the viewing user who is operating the terminal device 2.

Changes in display of the gift object 406c are described below with reference to FIG. 6A to FIG. 7B.

Figure 6A:
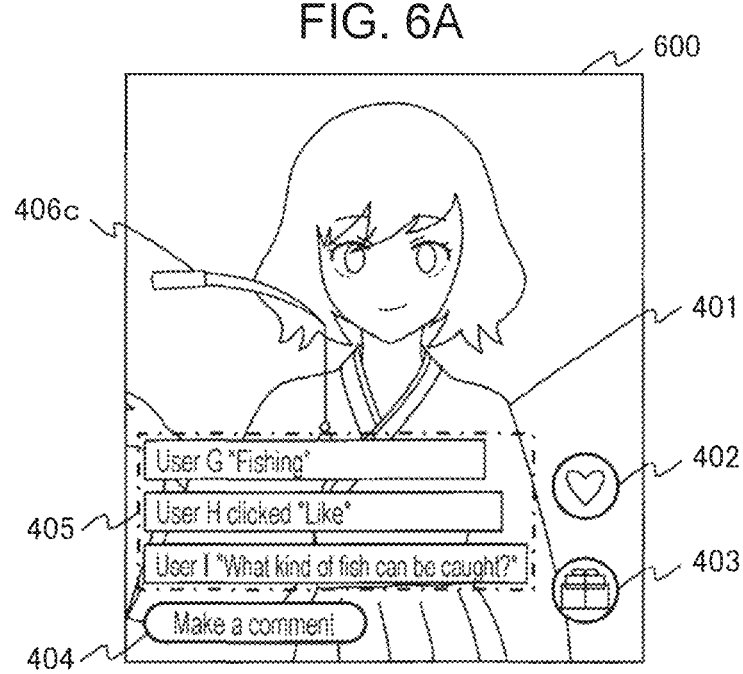
FIGS. 6A and 6B are diagrams each illustrating an example screen displayed on the display device of the terminal device.

FIG. 6A is a diagram illustrating an example of a distribution screen 600 displayed after an elapse of a predetermined time since display of the distribution screen 510 illustrated in FIG. 5B. The distribution screen 600 includes the character object 401, the evaluation button 402, the gift button 403, the comment button 404, and the response information display area 405 as in the distribution screen 400 illustrated in FIG. 4A.

On the distribution screen 600 illustrated in FIG. 6A, as the gift object 406c, a moving image in which a fishing rod and a lure are connected with each other by a fishing line and the lure is moving downward on the distribution screen 600 is displayed.

Figure 6B:
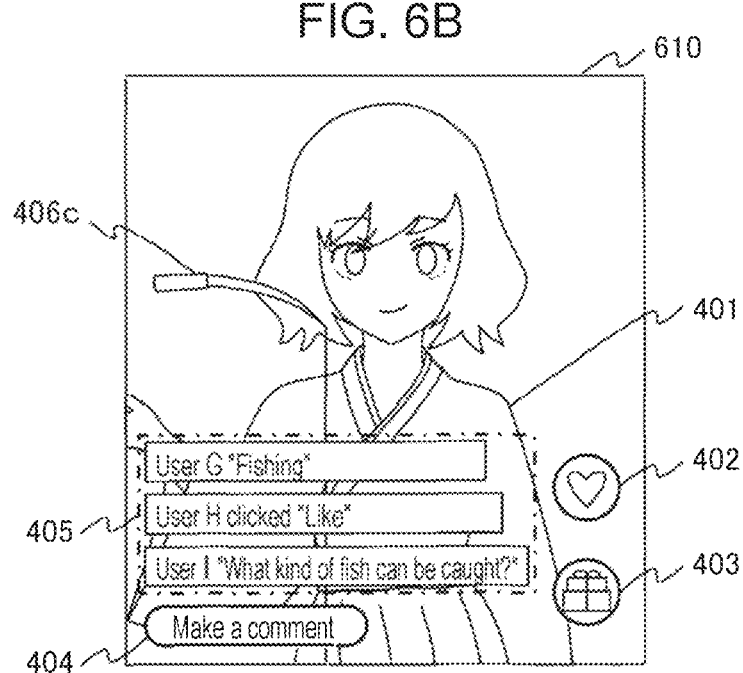

FIG. 6B is a diagram illustrating an example of a distribution screen 610 displayed after an elapse of a predetermined time since display of the distribution screen 600 illustrated in FIG. 6A. The distribution screen 610 includes the character object 401, the evaluation button 402, the gift button 403, the comment button 404, and the response information display area 405 as in the distribution screen 400 illustrated in FIG. 4A.

On the distribution screen 610 illustrated in FIG. 6B, as the gift object 406c, an image that shows the fishing rod and the fishing line and shows a situation where the lure has moved below the lower edge of the distribution screen 610 and is not included in the distribution screen 610 anymore is displayed.

Figure 7A:
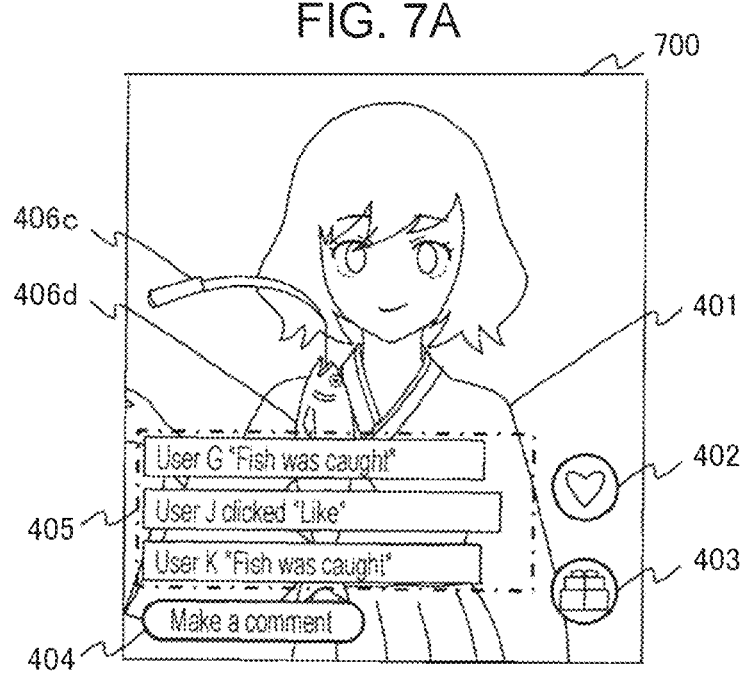
FIGS. 7A and 7B are diagrams each illustrating an example screen displayed on the display device of the terminal device.

FIG. 7A is a diagram illustrating an example of a distribution screen 700 displayed after an elapse of a predetermined time since display of the distribution screen 610 illustrated in FIG. 6B. The distribution screen 700 includes the character object 401, the evaluation button 402, the gift button 403, the comment button 404, and the response information display area 405 as in the distribution screen 400 illustrated in FIG. 4A.

On the distribution screen 700 illustrated in FIG. 7A, as the gift object 406c, an image that shows the fishing rod and the fishing line is displayed, and a moving image of a fish object 406d that is moving upward on the distribution screen 700 in the direction in which the fishing line extends is further displayed. The gift object 406c and the fish object 406d are displayed to thereby provide the user with a moving image showing that the fishing rod and the fishing line that correspond to the gift object 406c are used to catch the fish object 406d.

Figure 7B:
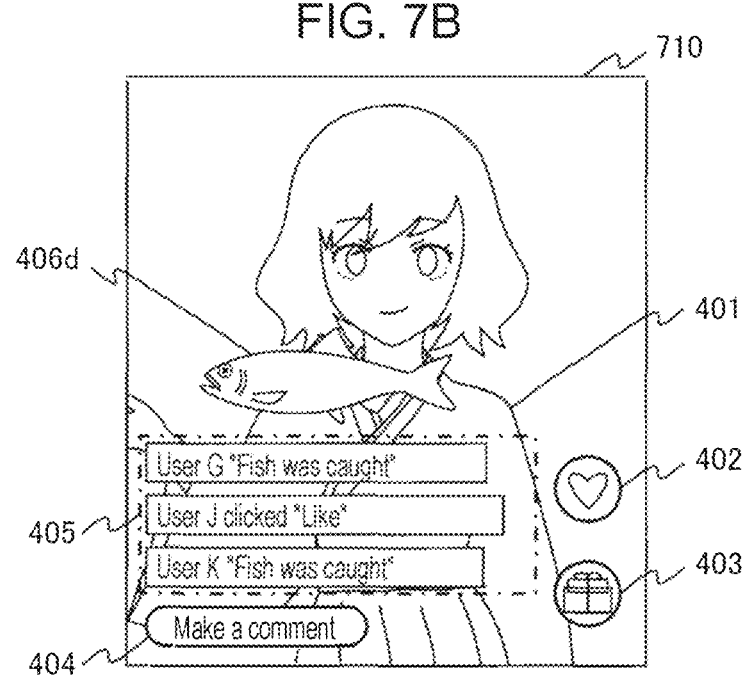

FIG. 7B is a diagram illustrating an example of a distribution screen 710 displayed after an elapse of a predetermined time since display of the distribution screen 700 illustrated in FIG. 7A. The distribution screen 710 includes the character object 401, the evaluation button 402, the gift button 403, the comment button 404, and the response information display area 405 as in the distribution screen 400 illustrated in FIG. 4A.

On the distribution screen 710, the fish object 406d that has moved to a predetermined position is displayed. The predetermined position is a position at which, for example, the fishing rod and the fishing line that correspond to the gift object 406c are connected with each other (an end point of the fishing rod). After the fish object 406d has moved to the predetermined position, display of the gift object 406c ends. After the fish object 406d has moved to the predetermined position, display of the fish object 406d ends after a predetermined time has further elapsed.

The fish object 406d illustrated in FIGS. 7A and 7B is randomly selected from among a plurality of types of fish objects 406. An example of a selection process performed by the server device 3 is described below.

The plurality of types of fish objects 406 are categorized into a plurality of groups (for example, group 1, group 2, and group 3). For example, in a case where each fish object 406 is associated with information indicating a degree of rarity, group 1 is a group of the fish objects 406 having a high degree of rarity (super-rare), group 2 is a group of the fish objects 406 having an intermediate degree of rarity (rare), and group 3 is a group of the fish objects 406 having a low degree of rarity (normal).

Each fish object 406 need not be categorized into one of the groups according to its degree of rarity and may be categorized according to, for example, the time when fish indicated by the fish object 406 are in season or the market price of the fish.

Groups 1 to 3 are assigned selection probabilities. For example, group 1 is assigned a selection probability of 5%, group 2 is assigned a selection probability of 20%, and group 3 is assigned a selection probability of 75%. Each terminal device 2 randomly selects a group in accordance with the selection probabilities assigned to groups 1 to 3. That is, the reproduction unit 274 of each terminal device 2 selects group 1 with a probability of 5%, selects group 2 with a probability of 20%, and selects group 3 with a probability of 75%. Next, the reproduction unit 274 randomly selects one fish object 406d from among the one or more types of fish objects 406 in the selected group with equal probability. The reproduction unit 274 displays the distribution screen 700 and the distribution screen 710 on which the selected fish object 406d appears, and the selection process ends. Note that the selection process may be performed by a processor 33 of the server device 3. In this case, distribution data for displaying the distribution screen 700 and the distribution screen 710 is generated by the server device 3 and distributed to each terminal device 2.

Figure 8A:
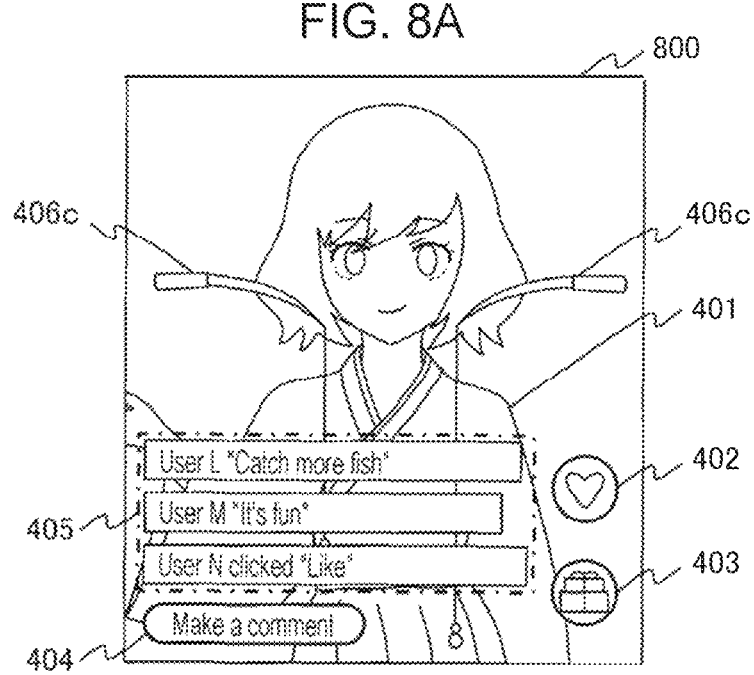
FIGS. 8A and 8B are diagrams each illustrating an example screen displayed on the display device of the terminal device.
Figure 8B:
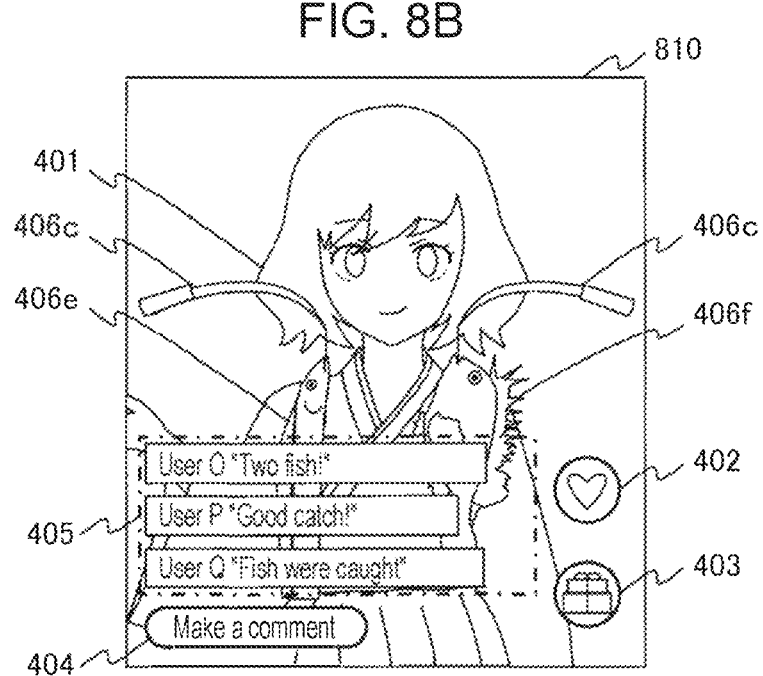

FIG. 8A, FIG. 8B, and FIG. 9A are diagrams respectively illustrating an example of a distribution screen 800, that of a distribution screen 810, and that of a distribution screen 900 displayed on the display device 23 after transmission of display requests for other gift objects. The distribution screen 800, the distribution screen 810, and the distribution screen 900 each include the character object 401, the evaluation button 402, the gift button 403, the comment button 404, and the response information display area 405 as in the distribution screen 400 illustrated in FIG. 4A. The distribution screen 800, the distribution screen 810, and the distribution screen 900 each include two gift objects 406c and 406c each imitating a fishing rod.

The gift objects 406c and 406c in a case where the distribution screen 800, the distribution screen 810, and the distribution screen 900 are screens displayed by the terminal device 2 of the distributing user are described. The server device 3 receives display requests that each include gift object information (an object ID, etc.) from the terminal devices 2 of two viewing users and transmits distribution data including the display requests to the terminal device 2 of the distributing user. The reproduction unit 274 of the terminal device 2 of the distributing user displays the gift objects 406c and 406c that are object images corresponding to the pieces of gift object information included in the distribution data received from the server device 3 (the pieces of gift object information included in the respective display requests).

The gift objects 406c and 406c in a case where the distribution screen 800, the distribution screen 810, and the distribution screen 900 are screens displayed by the terminal device 2 of a viewing user other than the terminal device 2 that has transmitted a display request are described. The server device 3 receives display requests that each include gift object information from the terminal devices 2 of two viewing users and transmits distribution data including the display requests to the terminal devices 2 of the other viewing users other than the terminal devices 2 that each have transmitted the display request. The reproduction unit 274 of the terminal device 2 of each of the viewing users displays the gift objects 406c and 406c that are object images corresponding to the pieces of gift object information included in the distribution data received from the server device 3 (the pieces of gift object information included in the respective display requests).

The gift objects 406c and 406c in a case where the distribution screen 800, the distribution screen 810, and the distribution screen 900 are screens displayed by the terminal device 2 that has transmitted a display request including gift object information (the terminal device 2 of one of the two viewing users) are described. The server device 3 receives a display request that includes gift object information from the terminal device 2 of the other of the two viewing users and transmits distribution data including the display request to the terminal device 2 of the one of the two viewing users. The reproduction unit 274 of the terminal device 2 of the one of the two viewing users displays the gift object 406c that is an object image corresponding to information indicating a candidate object selected by the one of the two viewing users who is operating the terminal device 2 and also displays the gift object 406c that is an object image corresponding to the gift object information included in the distribution data received from the server device 3 (the gift object information included in the display request).

On the distribution screen 800, the distribution screen 810, and the distribution screen 900, the two gift objects 406c and 406c are displayed, and display thereof changes similarly to display of the gift object 406c that changes as illustrated in FIG. 6A to FIG. 7B.

On the distribution screen 800 illustrated in FIG. 8A, as each of the two gift objects 406c and 406c, a moving image is displayed in which a fishing rod and a lure are connected with each other by a fishing line and the lure is moving downward on the distribution screen 800. On the distribution screen 810 illustrated in FIG. 8B, as each of the two gift objects 406c and 406c, an image that shows the fishing rod and the fishing line is displayed, and a moving image of fish objects 406e and 406f that are moving upward on the distribution screen 810 in the directions in which the respective fishing lines extend is further displayed. On the distribution screen 900 illustrated in FIG. 9A, the fish objects 406e and 406f that have moved to predetermined positions are displayed. On the distribution screen 900, the fish objects 406e and 406f after movement to the predetermined positions are displayed. After the fish objects 406e and 406f have moved to the predetermined positions, display of the gift objects 406c and 406c ends. After the fish objects 406e and 406f have moved to the predetermined positions, display of the fish objects 406e and 406f ends after a predetermined time has elapsed.

Each of the fish objects 406e and 406f is randomly selected from among the plurality of types of fish objects 406 similarly to the fish object 406d.

A selection probability used in the selection process is changed in accordance with information about the distributing user and/or information about the viewing user who has selected the gift object 406c corresponding to a fish object.

FIG. 9B is a diagram illustrating an example of a distribution screen 910 displayed on the display device 23 after display requests for gift objects have been transmitted. The distribution screen 910 includes the character object 401, the evaluation button 402, the gift button 403, the comment button 404, and the response information display area 405 as in the distribution screen 400 illustrated in FIG. 4A. The distribution screen 910 further includes gift objects 406g and 406h.

The gift objects 406g and 406h in a case where the distribution screen 910 is a screen displayed by the terminal device 2 of the distributing user are described. The server device 3 receives display requests that each include gift object information (an object ID, etc.) from the terminal devices 2 of respective viewing users and transmits distribution data including the display requests to the terminal device 2 of the distributing user. The reproduction unit 274 of the terminal device 2 of the distributing user displays the gift objects 406g and 406h that are object images corresponding to the pieces of gift object information included in the distribution data received from the server device 3 (the pieces of gift object information included in the respective display requests).

The gift objects 406g and 406h in a case where the distribution screen 910 is a screen displayed by the terminal device 2 of a viewing user other than the terminal device 2 that has transmitted a display request are described. The server device 3 receives display requests that each include gift object information from the terminal devices 2 of viewing users and transmits distribution data including the display requests to the terminal devices 2 of the other viewing users other than the terminal devices 2 that each have transmitted the display request. The reproduction unit 274 of the terminal device 2 of each of the viewing users displays the gift objects 406g and 406h that are object images corresponding to the pieces of gift object information included in the distribution data received from the server device 3 (the pieces of gift object information included in the respective display requests).

In a case where the distribution screen 910 is a screen displayed by the terminal devices 2 that each have transmitted a display request including gift object information, the terminal devices 2 display the gift objects 406g and 406h that are object images corresponding to pieces of information indicating candidate objects selected by the viewing users who are operating the terminal devices 2 respectively.

Each of the gift objects 406g and 406h may be changed in accordance with information about the distributing user and/or information about the viewing users who have selected the gift objects 406g and 406h respectively. A process for changing the gift objects 406g and 406h will be described in detail below.

On the distribution screen 910 illustrated in FIG. 9B, the gift object 406g and the gift object 406h are the same objects; however, information about the viewing user who has selected the gift object 406g and information about the viewing user who has selected the gift object 406h are different, and therefore, the gift object 406g and the gift object 407h are displayed in different forms.

Various tables that are used to display the screens illustrated in FIG. 4A to FIG. 9B and the functions of the reproduction unit 274 are described in detail.

Various Tables

FIGS. 10A to 10D are diagrams respectively illustrating example data structures of the user table T1, the object table T2, the activity table T3, and the selection probability table T4 stored in the storage device 22. Note that the user table T1, the object table T2, the activity table T3, and the selection probability table T4 may be stored in the storage device 32 of the server device 3. In this case, the terminal device 2 may obtain (receive) and store in the storage device 22 the latest user table T1, the latest object table T2, the latest activity table T3, and the latest selection probability table T4 at a predetermined timing.

User Table T1

FIG. 10A illustrates an example data structure of the user table T1 for managing users (distributing users and viewing users) who participate in the video distribution system 1. The user table T1 includes data items, such as a user ID, a name, a character object, and a possessed object, in association with one another for each user.

The user ID is an example of identification data for uniquely identifying each user. The name is an example of data indicating the name of each user.

As the data item of character object, for example, a model ID for identifying model data that is used to generate an animation of a character object is stored. The model data is stored in the storage device 22 in association with the model ID. The model data may be 3D model data for generating a 3D animation or may be 2D model data for generating a 2D animation. The model data includes, for example, rig data ("skeleton data") indicating the skeletal structure of the face of the character object and the skeletal structure of parts other than the face thereof and surface data indicating the shape and texture of the surface of the character object. The model data may include a plurality of different pieces of model data. The plurality of pieces of model data may have different pieces of rig data or may have the same rig data. The plurality of pieces of model data may have different pieces of surface data or may have the same surface data.

As the data item of possessed object, an object ID indicating an object possessed by each user is stored. The possessed object is an object obtained by the user using a "coin" having a virtual monetary value in a purchase function of the video distribution system 1. For example, during distribution of a distribution screen, the distributing user can operate the terminal device 2 to put a possessed object on the character object included in the distribution screen.

The user table T1 may include object display information in association with each user. For example, the object display information is an object ID indicating a put-on object displayed in a video in association with the character object of the distributing user.

Object Table T2

FIG. 10B illustrates an example data structure of the object table T2 for managing objects selected as gift objects. The object table T2 includes data items, such as an object ID, image information, a degree of rarity, and a location of placement, in association with one another for each object.

The object ID is an example of identification data for uniquely identifying each object. The image information indicates one or more still images corresponding to each object. The image information may indicate one or more moving images corresponding to each object. The degree of rarity is information that indicates the degree of rarity of each object. The location of placement is information that indicates a location where one or more images of each object indicated by image information are displayed. Note that in a case where the display position and display range of a character object are specified, information indicating a position relative to the character object may be stored as the location of placement.

The objects are categorized into a plurality of types. Examples of the types of objects include an effect object that represents an effect gift, a usual object that represents a usual gift, a put-on object that represents a put-on gift, and a message object that represents a message gift. For each type of object, the image information and the location of placement are described below.

The effect object is an object that affects the impression of the entire distribution screen. The effect object is an object that imitates, for example, confetti. In a case where the effect object is an object that imitates confetti, an image showing a plurality of small pieces of paper is stored as the image information.

As the location of placement of the effect object, information indicating "space" is stored. For example, an object that imitates confetti is displayed throughout the distribution screen. The effect object may be displayed so as to overlap with the character object. Unlike the put-on object described below, the effect object is displayed without being associated with a specific part of the character. Accordingly, the video distribution system 1 can display the effect object in accordance with an instruction from a viewing user to thereby change the impression of the entire distribution screen from the impression thereof before the effect object is displayed.

The usual object is an object that imitates, for example, a stuffed toy, a bouquet, an accessory, or any other item suitable for a gift or a present. As the location of placement of the usual object, information indicating "space" is stored. For example, information about a predetermined movement route is associated with the usual object, and the usual object that moves within the distribution screen along the predetermined movement route is displayed. Note that the usual object may be displayed so as to overlap with the character object. In this case, unlike the put-on object described below, the usual object is displayed without being associated with a specific part of the character object.

In a case where the usual object is displayed so as to overlap with the character object, for example, the usual object may be displayed so as to overlap with a part other than the "head" including the "face" of the character object. In this case, the usual object is displayed so as not to overlap with the "head" of the character object. The usual object may be displayed so as to overlap with a part other than the "upper half of the body" including the "face" of the character object. In this case, the usual object is displayed so as not to overlap with the "upper half of the body" of the character object.

The put-on object is an object that is displayed on a distribution screen in association with a specific part (put-on location) of the character object. Examples of the specific part include the left front side, the right front side, the left rear side, the right rear side, the central front side, and the central rear side of the head, the left eye, the right eye, the left ear, the right ear, and the entire hair in the head part of the character object. The specific part may be the thumb, the ring finger, the wrist, the elbow, the shoulder, the upper arm, the entire hand, the entire arm, etc.

The put-on object associated with a specific part of the character object is displayed on a distribution screen so as to be in contact with the specific part of the character object. The put-on object associated with a specific part of the character object may be displayed on a distribution screen so as to cover the specific part of the character object in part or in whole. The specific part may be identified with 3D position information indicating a position in a 3D coordinate space or may be associated with position information about a 3D coordinate system.

The image information of the put-on object is image information for imitating, for example, an accessory (a hairband, a necklace, earrings, etc.), clothing (a T-shirt, a dress, etc.), or a costume that is put on a character object, or any other item that can be put on a character object.

As the location of placement of the put-on object, information indicating a put-on part that is a part of a character object with which the put-on object is associated is stored. For example, in a case where the put-on object is a "hairband", as the location of placement of the put-on object, information indicating the "head" of the character object is stored. In a case where the put-on object is a "T-shirt", as the location of placement of the put-on object, information indicating the "trunk" of the character object is stored.

As the location of placement of the put-on object, information indicating a plurality of put-on parts in a 3D coordinate space may be stored. For example, in a case where the put-on object is a "hairband", as the location of placement of the put-on object, information indicating two parts of the character object, namely, "the left rear side of the head" and the "right rear side of the head", may be stored. Accordingly, the put-on object that imitates a "hairband" is displayed so as to be put on both "the left rear side of the head" and the "right rear side of the head" of the character object.

In a case where a plurality of types of put-on objects for which the locations of placement are the same are put on a character object, the plurality of types of put-on objects are put on the character object at time intervals. Accordingly, the plurality of types of put-on objects for which the put-on parts are the same are not simultaneously put on the character object. For example, in a case where "head" is stored as the location of placement of both a put-on object representing a "hairband" and a put-on object representing a "cap", the put-on object representing a "hairband" and the put-on object representing a "cap" are not simultaneously displayed on the head of the character object.

The object table T2 may include a display time corresponding to each type of object in association with the object ID of the object. For example, as the display time of the put-on object, a time longer than the display time of the effect object and longer than the display time of the usual object may be stored. For example, in a case where "60 seconds" is stored as the display time of the put-on object, "5 seconds" may be stored as the display time of the effect object and "10 seconds" may be stored as the display time of the usual object.

Activity Table T3

FIG. 10C illustrates an example data structure of the activity table T3 for managing various types of information indicating the degree of involvement of each user in the video distribution system 1. The activity table T3 includes data items, such as a user ID, points, and used coins, in association with one another for each user.

The points correspond to, for example, information indicating a point value that corresponds to the number of times evaluation data and/or comment data have been transmitted by each viewing user. The used coins correspond to information indicating an accumulated value of used coins calculated each time each distributing user uses a "coin" having a virtual monetary value.

Selection Probability Table T4

FIG. 10D illustrates an example data structure of the selection probability table T4 for managing selection probabilities used in a selection process for a gift object. The selection probability table T4 includes data items, such as a selection probability ID, a probability for a degree of rarity (SR), a probability for a degree of rarity (R), and a probability for a degree of rarity (N), in association with one another for each selection probability.

Functions of Reproduction Unit 274

The reproduction unit 274 generates an animation of a character object on the basis of motion data. For example, in a case where motion data is generated by the generation unit 271, the reproduction unit 274 extracts the model ID of a character object associated with the user ID stored in the storage device 22 from the user table T1. In a case where motion data is included in distribution data received by the reception unit 273, the reproduction unit 274 extracts the model ID of a character object associated with a user ID included in the distribution data from the user table T1.

Next, the reproduction unit 274 reads model data associated with the extracted model ID from the storage device 22. The reproduction unit 274 generates an animation of the character object on the basis of the read model data and the motion data.

In a case where face motion data is included in the motion data, the reproduction unit 274 generates an animation of the character object such that the facial expression of the character object changes on the basis of the face motion data. Accordingly, the reproduction unit 274 can generate an animation of the character object that moves in synchronization with the motion of the face of the distributing user on the basis of the read model data and the face motion data.

In a case where face motion data and body motion data are included in the motion data, the reproduction unit 274 generates an animation of the character object that moves in synchronization with the motion of the face and body of the distributing user on the basis of the read model data, the face motion data, and the body motion data.

The reproduction unit 274 generates a distribution screen that displays a moving image including the generated animation of the character object and a background image showing a background generated by using the background data stored in the storage device 22. In a case where sound data of the distributing user is obtained by the microphone 26 or in a case where sound data of the distributing user is included in the distribution data, the reproduction unit 274 may add a sound (uttered by the distributing user) generated on the basis of the sound data to the generated moving image. Accordingly, the reproduction unit 274 can generate an animation of the character object that moves in synchronization with the motion of the face and body of the distributing user and generate a distribution screen obtained by adding a sound uttered by the distributing user to the animation.

Further, in accordance with a request from a distributing user, the reproduction unit 274 may put a possessed object (for example, a put-on object) of the distributing user on the character object. For example, in a case where a distributing user operates the terminal device 2 to give an instruction for putting a put-on object on the character object of the distributing user before or after the start of distribution of a distribution screen, the reproduction unit 274 puts the put-on object on the character object of the distributing user on the basis of this display request.

In a case where a display request for a gift object is included in distribution data, the reproduction unit 274 identifies information to be included in the distribution screen in accordance with the display request. Note that in this case, the reproduction unit 274 extracts points associated with a user ID included in the display request, adds a predetermined number of additional points to the extracted points, and stores the points after addition in the activity table T3 in association with the user ID included in the display request. In a case where the display request included in the distribution data is a display request for evaluation data, the reproduction unit 274 may store a value obtained by multiplying the number of times evaluation data has been transmitted by a predetermined coefficient in the activity table T3 in association with the user ID as points. In this case, the number of times evaluation data has been transmitted is stored in the activity table T3 in association with the user ID. When the activity table T3 is updated, the updated activity table T3 is transmitted to the server device 3 to thereby update the activity table T3 stored in the storage device 32 of the server device 3.

In a case where the identified information is the object ID of a specific effect object, the reproduction unit 274 refers to the object table T2, extracts a still image or a moving image (image information) of an effect object associated with the object ID of the specific effect object, and generates a distribution screen that includes the extracted still image or moving image. For example, in a case where a display request for an effect gift showing confetti or fireworks is made, the reproduction unit 274 generates a distribution screen that includes the moving image of an effect object imitating confetti or fireworks.

In a case where the identified information is the object ID of a specific usual object, the reproduction unit 274 refers to the object table T2 and extracts a still image or a moving image (image information) and the location of placement of a usual object associated with the object ID of the specific usual object. Next, the reproduction unit 274 generates a distribution screen that includes the still image or moving image of the usual object placed at a position indicated by the location of placement.

The reproduction unit 274 may generate a distribution screen that includes a moving image of a usual object moving within a display area of the distribution screen. For example, the reproduction unit 274 may generate a distribution screen that includes a moving image of a usual object moving downward from the top of the distribution screen. In this case, the usual object may be kept displayed within the display area of the distribution screen during a period from when the usual object starts moving downward to when the usual object reaches the bottom of the distribution screen and may disappear from the distribution screen after the usual object has reached the bottom of the distribution screen.

Note that the movement route of a usual object may be a route in the direction from the left to the right, in the direction from the right to the left, in the direction from the top left to the bottom left, or in any other direction on the distribution screen or may be a route along a straight path, a round path, an elliptic path, a spiral path, or any other path.

In a case where the identified information is the object ID of a specific put-on object, the reproduction unit 274 refers to the object table T2 and extracts image information and the location of placement of a put-on object associated with the object ID of the specific put-on object. Next, the reproduction unit 274 generates a distribution screen that includes the image information of the put-on object that is put on the put-on part indicated by the location of placement.

For example, in a case where the specific put-on object is a "hairband imitating cat ears", the reproduction unit 274 generates a distribution screen that includes the character object wearing the put-on object imitating a "hairband" on its head (the location of placement associated with the object ID of the "hairband"). Note that the put-on object may be displayed on the distribution screen so as to move in association with the motion of the put-on part (location of placement) of the character.

Note that in a case where a gift object (an effect object, a usual object, a put-on object, etc.) is included in a distribution screen in accordance with a display request from the terminal device 2 of a viewing user, the reproduction unit 274 may change display of the gift object on the basis of information about the distributing user concerned in the distribution screen and/or information about the viewing user making the display request and generate the distribution screen including the changed gift object.

For example, the reproduction unit 274 refers to the activity table T3 and extracts points associated with the user ID of the viewing user included in the display request. In a case where the number of the extracted points exceeds a predetermined number of points, the reproduction unit 274 changes display of the gift object corresponding to the display request.

Examples of a change in display of the gift object include a change in the display color of the image (still image or moving image) of the gift object, a change in at least one of the saturation, brightness, or hue of the image of the gift object, a change to an image of the gift object that performs a predetermined motion (moves along a predetermined route, moves repeatedly, etc.), a change of the image of the gift object to another image, a change in the size of the image of the gift object, a change in the transparency of the image of the gift object, an addition of a predetermined image to the image of the gift object, and hiding of at least part of the image of the gift object. For example, in the example illustrated in FIG. 9B, the gift object 406g is an object that does not change in display, and the gift object 406h is an object that changes in display.

In a case where points associated with the user ID of a viewing user correspond to the number of times the viewing user has transmitted evaluation data (for example, in a case where the points correspond to a value obtained by multiplying the number of times transmission has been performed by a predetermined coefficient), as the viewing user is involved in the video distribution system 1 more actively, the possibility that display of a gift object changes increases. Accordingly, the motivation of the viewing user to view can be increased. Note that the number of times a viewing user has transmitted evaluation data may be the number of times the viewing user has transmitted evaluation data for distribution screens currently and previously distributed only by a distributing user that distributes a distribution screen that the viewing user is currently viewing.

In a case where points associated with the user ID of a viewing user correspond to the number of times the viewing user has transmitted comment data (for example, in a case where the points correspond to a value obtained by multiplying the number of times transmission has been performed by a predetermined coefficient), as the viewing user is involved in the video distribution system 1 more actively, the possibility that display of a gift object changes increases. Accordingly, the motivation of the viewing user to view can be increased. Note that the number of times a viewing user has transmitted comment data may be the number of times the viewing user has transmitted comment data for the current and previous distribution screens distributed only by a distributing user that distributes a distribution screen that the viewing user is currently viewing.

Note that points associated with the user ID of a viewing user may be based on both the number of times evaluation data has been transmitted by the viewing user and the number of times comment data has been transmitted by the viewing user (for example, the points may be the sum of a numerical value obtained by multiplying the number of times evaluation data has been transmitted by a first coefficient and a numerical value obtained by multiplying the number of times comment data has been transmitted by a second coefficient). Points associated with the user ID of a viewing user may be based on the number of times a display request for a gift object has been made by the viewing user. Note that viewing users may be ranked and displayed on the basis of the numbers of points associated with the user IDs of the respective viewing users.

Server Device 3

Figure 11:
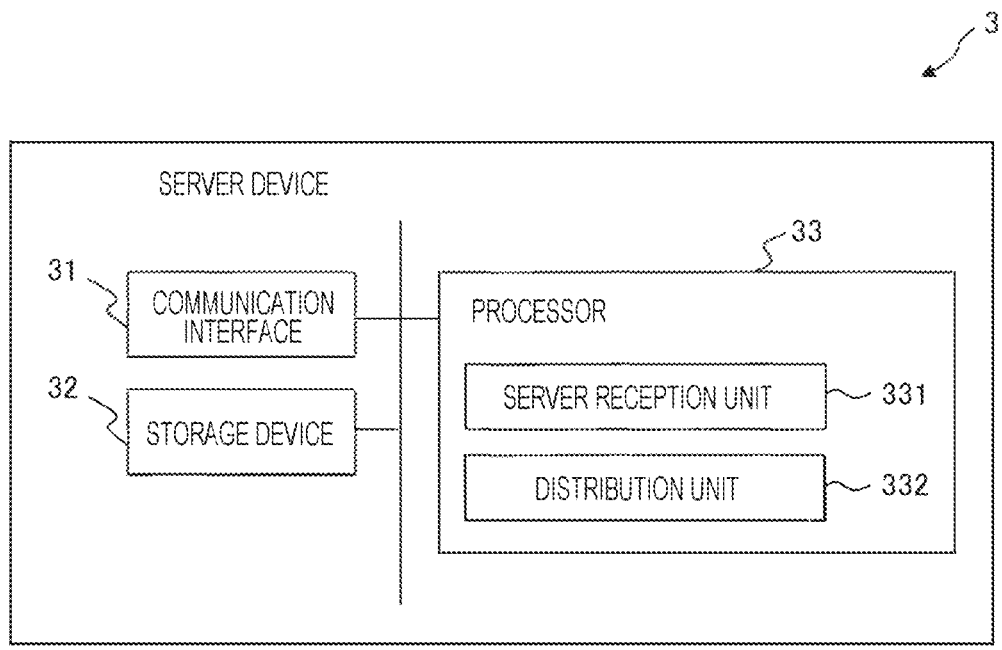
FIG. 11 is a diagram schematically illustrating an example configuration of a server device.

FIG. 11 is a diagram schematically illustrating an example configuration of the server device 3.

The server device 3 generates distribution data on the basis of motion data from the terminal device 2 of a distributing user and/or response information from the terminal device 2 of a viewing user and distributes (transmits) the distribution data to the terminal device 2 of a viewing user. For this, the server device 3 includes a communication interface 31, the storage device 32, and the processor 33.

The communication interface 31 is implemented as hardware, firmware, or communication software, such as a TCP/IP driver or a PPP driver, or a combination thereof. The server device 3 can transmit data to other devices and receive data from other devices via the communication interface 31.

The storage device 32 is, for example, a semiconductor memory device including a RAM and a ROM. The storage device 32 may be, for example, a magnetic disk, an optical disk, or any other storage device capable of storing data. The storage device 32 stores an operating system program, a driver program, an application program, data, etc. used in processing by the processor 33.

The processor 33 is a processing device that loads the operating system program, the driver program, and the application program stored in the storage device 32 to a memory and executes instructions included in the loaded programs. The processor 33 is, for example, an electronic circuit, such as a CPU, an MPU, a DSP, or a GPU, or a combination of various electronic circuits. The processor 33 may be implemented as an integrated circuit, such as an ASIC, a PLD, an FPGA, or an MCU. In FIG. 11, the processor 33 is illustrated as a single constituent element; however, the processor 33 may be an aggregate of a plurality of physically separated processors. The processor 33 may also be encompassed by or compare control circuitry and/or processing circuitry. Additional structural configuration of the server device 3, including processor 33, is described below with respect to FIG. 13.

The processor 33 executes various instructions included in a control program to thereby function as a server reception unit 331 and a distribution unit 332.

Server Reception Unit 331

The server reception unit 331 receives motion data or receives motion data and sound data transmitted from the terminal device 2 of a distributing user via the communication interface 31 together with the user ID. The server reception unit 331 receives various requests (a display request, an end request, etc.) transmitted from the terminal device 2 of a viewing user or a distributing user via the communication interface 31.

Distribution Unit 332

The distribution unit 332 distributes distribution data that includes various types of data (motion data (and a user ID), motion data and sound data (and a user ID), a display request, an end request, etc.) received by the server reception unit 331 to the terminal device 2 of the distributing user and to the terminal devices 2 of one or more viewing users via the communication interface 31.

Operation Sequence of Video Distribution System 1

Figure 12:
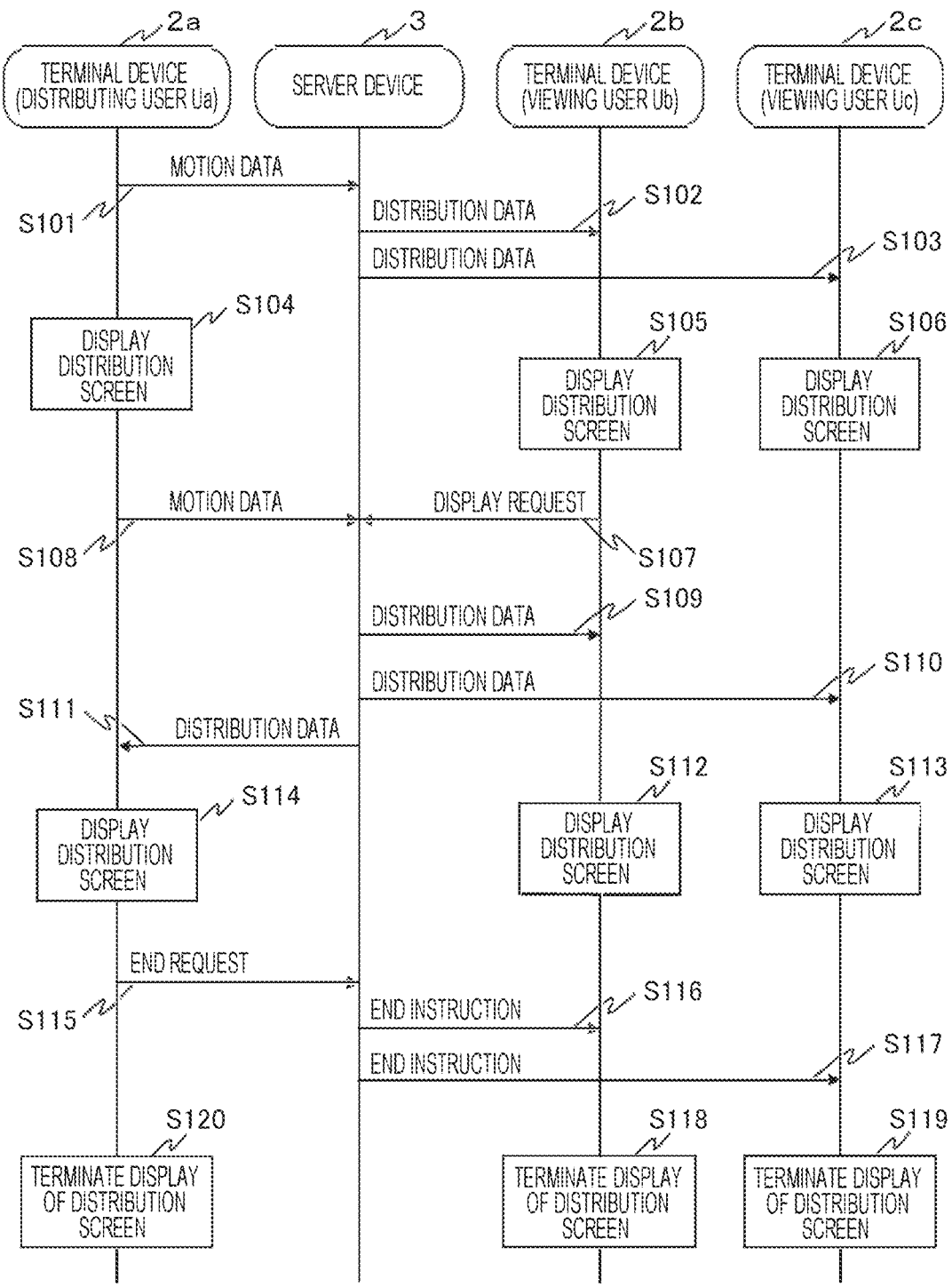
FIG. 12 is a sequence chart illustrating an example operation sequence of the video distribution system.

FIG. 12 is a sequence chart illustrating an example operation sequence of the video distribution system 1. This operation sequence is implemented mainly by the processor 27 and the processor 33 cooperating with the elements of the terminal device 2 and those of the server device 3 on the basis of the programs stored in advance in the storage device 22 and in the storage device 32. A description is given below under the assumption that a distributing user Ua operates a terminal device 2a, a viewing user Ub operates a terminal device 2b, and a viewing user Uc operates a terminal device 2c.

First, the transmission unit 272 of the terminal device 2a transmits motion data generated by the generation unit 271 to the server device 3 via the communication interface 21 (step S101). The transmission unit 272 may transmit sound data together with the motion data. The process in step S101 is successively performed at predetermined time intervals until distribution of a distribution screen ends, and therefore, the process from steps S101 to S107 is intermittently performed.

Next, the distribution unit 332 of the server device 3 distributes distribution data including the motion data received from the terminal device 2a to the terminal device 2b and the terminal device 2c via the communication interface 31 (steps S102 and S103). Note that the distribution data includes the user ID of the distributing user Ua.

Next, the reproduction unit 274 of the terminal device 2a generates drawing data for displaying a distribution screen on the basis of the motion data (and sound data) generated by the generation unit 271 and displays the distribution screen on the display device 23 on the basis of the generated drawing data (step S104). The reproduction unit 274 of the terminal device 2b generates drawing data for displaying a distribution screen on the basis of the distribution data received by the reception unit 273 and displays the distribution screen on the display device 23 on the basis of the generated drawing data (step S105). The reproduction unit 274 of the terminal device 2c generates drawing data for displaying a distribution screen on the basis of the distribution data received by the reception unit 273 and displays the distribution screen on the display device 23 on the basis of the generated drawing data (step S106).

Next, the transmission unit 272 of the terminal device 2b transmits to the server device 3 via the communication interface 21 a display request for displaying on a distribution screen, response information input by the viewing user Ub operating the input device 24 and/or a display request for displaying on a distribution screen, a gift object corresponding to gift object information (step S107).

The transmission unit 272 of the terminal device 2a keeps transmitting motion data (and sound data) generated by the generation unit 271 to the server device 3 via the communication interface 21 (step S108).

The distribution unit 332 of the server device 3 distributes distribution data including the motion data received from the terminal device 2a to the terminal device 2b via the communication interface 31 (step S109), distributes distribution data including the motion data received from the terminal device 2a and the response information and/or the gift object corresponding to the display request to the terminal device 2c via the communication interface 31 (step S110), and transmits distribution data including the response information and/or the gift object corresponding to the display request to the terminal device 2a (step S111).

Next, the reproduction unit 274 of the terminal device 2b generates drawing data for displaying a distribution screen on the basis of the response information input by the viewing user Ub operating the input device 24 and the distribution data received by the reception unit 273 and displays the distribution screen on the display device 23 on the basis of the generated drawing data (step S112). The reproduction unit 274 of the terminal device 2c generates drawing data for displaying a distribution screen on the basis of the distribution data received by the reception unit 273 and displays the distribution screen on the display device 23 on the basis of the generated drawing data (step S113). The reproduction unit 274 of the terminal device 2a generates drawing data for displaying a distribution screen on the basis of the motion data (and sound data) generated by the generation unit 271 and the distribution data received by the reception unit 273 and displays the distribution screen on the display device 23 on the basis of the generated drawing data (step S114).

The transmission unit 272 of the terminal device 2a transmits to the server device 3 via the communication interface 21 an end request for terminating the distribution screen made in accordance with an end operation performed on the input device 24 by the distributing user Ua (step S115).

Next, the distribution unit 332 of the server device 3 distributes an end instruction for terminating reproduction of the distribution screen to the terminal device 2b and the terminal device 2c via the communication interface 31 (steps S116 and S117).

Next, the reproduction unit 274 of the terminal device 2b terminates reproduction of the distribution screen in accordance with the end instruction received by the reception unit 273 (step S118). The reproduction unit 274 of the terminal device 2c terminates reproduction of the distribution screen in accordance with the end instruction received by the reception unit 273 (step S119).

The reproduction unit 274 of the terminal device 2a that has transmitted the end instruction terminates reproduction of the distribution screen (step S120).

Note that in the procedure illustrated in FIG. 12, omission of some of the steps that constitute the procedure, addition of a step that is not explicitly illustrated as a step that constitutes the procedure, and/or a change in the order of the steps are allowed, and the procedure to which such omission, addition, and/or a change in the order is made is included in the scope of the present disclosure without departing from the spirit of the present disclosure.

As described in detail above, in the video distribution system 1 of the present embodiment, display of the same gift object can be automatically changed on the basis of information about the distributing user concerned in the distribution screen and/or information about the viewing user who has made a display request. With the video distribution system 1 thus configured, the motivation of the distributing user and/or the viewing user to participate in a distribution event can be increased. In the video distribution system 1 thus configured, a gift object in various forms can be provided depending on the degree of involvement of the distributing user and/or the viewing user in the video distribution system 1. With the interaction between the distributing user and/or the viewing user involved in the video distribution system 1 and the video distribution system 1, the distributing user and/or the viewing user can make a new gift object be automatically displayed without any operation, and the interface can be simplified. Further, in the video distribution system 1, a new instruction by a distributing user and/or a viewing user and communication associated with the instruction for automatically changing display of a gift object are not necessary, and therefore, a delay in information processing due to the processing load of the terminal device 2 and that of the server device 3 and/or a delay in communication due to the load of the communication network can be prevented from occurring.

First Modification

Note that the present disclosure is not limited to the present embodiment. For example, the transmission unit 272 of the terminal device 2 of a distributing user may transmit captured image data obtained by the image capturing device 25 instead of motion data. For example, the transmission unit 272 of the terminal device 2 of a distributing user transmits pieces of captured image data successively output from the image capturing device 25 to the server device 3 via the communication interface 21 together with the user ID stored in the storage device 22. Next, when the server reception unit 331 receives the pieces of captured image data, the distribution unit 332 of the server device 3 generates and transmits to the terminal device 2 of each viewing user, distribution data including the received pieces of captured image data and the user ID of the distributing user. The reproduction unit 274 of each terminal device 2 displays a distribution screen that includes the pieces of captured image data and a background image. Note that the reproduction unit 274 of each terminal device may generate a distribution screen that does not include a background image. The reproduction unit 274 of each terminal device 2 may add a sound (uttered by the distributing user) generated on the basis of sound data to a generated moving image. Accordingly, the terminal device 2 can display a distribution screen that shows a live video of the distributing user.

Second Modification

The reproduction unit 274 of the terminal device 2 of a distributing user may use game video data indicating the status of a game played by the distributing user as distribution data. The game video data is data of a moving image obtained by capturing the game screen of a specific game that the distributing user is playing. In this case, the processor 27 of the terminal device 2 functions as a game advancing unit for advancing the specific game by executing various instructions included in a game program stored in the storage device 22. The game advancing unit advances the specific game in accordance with an instruction given by the distributing user operating the input device 24. The generation unit 271 of the terminal device 2 of the distributing user successively obtains images of the game screen of the running specific game in accordance with a recording instruction given by the distributing user, generates pieces of data of a moving image, and successively outputs the pieces of data as pieces of game video data.

Next, the transmission unit 272 of the terminal device 2 of the distributing user transmits the pieces of game video data successively output from the generation unit 271 to the server device 3 via the communication interface 21 together with the user ID stored in the storage device 22. Next, when the server reception unit 331 receives the pieces of game video data, the distribution unit 332 of the server device 3 generates and transmits to the terminal device 2 of each viewing user, distribution data that includes the received pieces of game video data and the user ID of the distributing user. The reproduction unit 274 of each terminal device 2 may generate a distribution screen for displaying a moving image that includes the received pieces of game video data and a background image showing a background generated by using the background data stored in the storage device 22. Note that the reproduction unit 274 of each terminal device 2 may generate a distribution screen that does not include a background image. Accordingly, the terminal device 2 of each viewing user can display a distribution screen showing a running game that is being played by the distributing user in real time.

Game video data transmitted to the server device 3 by the transmission unit 272 of the terminal device 2 of the distributing user may be data of a moving image obtained by capturing the game screen of a specific game previously played by the distributing user. In this case, the generation unit 271 of the terminal device 2 of the distributing user successively obtains images of the game screen of the running specific game in accordance with a recording instruction given by the distributing user, generates data of a moving image, and stores the data in the storage device 22 as game video data. The transmission unit 272 of the terminal device 2 of the distributing user transmits the game video data stored in the storage device 22 to the server device 3 via the communication interface 21 together with the user ID stored in the storage device 22. Accordingly, the video distribution system 1 that can distribute the play history of the game previously played by the distributing user can be provided.

Third Modification

In a process for changing display of a gift object, the reproduction unit 274 may use any information as information about a distributing user concerned in the distribution screen and/or information about a viewing user who has made a display request for the gift object. Hereinafter, a distributing user concerned in a distribution screen that is currently distributed is referred to as a current distributing user, a viewing user that has made a display request for a gift object for the distribution screen that is currently distributed is referred to as a current viewing user, and a modification of the process for changing display of the gift object is described.

For example, the reproduction unit 274 may refer to the activity table T3, extract used coins associated with the user ID of the current viewing user included in the display request, and in a case where the value of the extracted used coins exceeds a predetermined value, change display of the gift object corresponding to the display request. Accordingly, as the current viewing user is involved in the video distribution system 1 more actively, the possibility that display of the gift object changes increases, and the motivation of the current viewing user to view can be increased accordingly.

The reproduction unit 274 may change display of the gift object in a case where a condition concerning a paid gift object selected by the current viewing user as the gift object is satisfied.

The condition concerning a paid gift object is a condition that, for example, the total amount of the monetary values of paid gift objects selected by the current viewing user as gift objects displayed on the distribution screen that is currently distributed during a period from the start of distribution of the distribution screen that is currently distributed to the current time is greater than or equal to a first predetermined amount. The condition concerning a paid gift object may be a condition that the total amount of the monetary values of paid gift objects selected by the current viewing user as gift objects displayed on a distribution screen previously distributed by the current distributing user and on the distribution screen that is currently distributed is greater than or equal to a second predetermined amount.

The condition concerning a paid gift object may be a condition that the total amount of the monetary values of paid gift objects selected by each of the all viewing users as gift objects displayed on the distribution screen that is currently distributed during a period from the start of distribution of the distribution screen that is currently distributed to the current time is greater than or equal to a third predetermined amount. The condition concerning a paid gift object may be a condition that the total amount of the monetary values of paid gift objects selected by the all viewing users as gift objects displayed on a distribution screen previously distributed by the current distributing user and on the distribution screen that is currently distributed is greater than or equal to a fourth predetermined amount.

The reproduction unit 274 may change display of a gift object corresponding to a display request on the basis of information indicating the number of times the current viewing user has made a request for association (for example, following) to other users. An example of a process concerning a request for association is described below. First, in response to a viewing user selecting an association button (for example, a follow button) on a distribution screen on which the association button is displayed, the transmission unit 272 of the terminal device 2 transmits to the server device 3 via the communication interface 21 a request from the viewing user for one-way association to the distributing user concerned in the distribution screen. The request for association includes the user ID of the viewing user who has selected the association button. The server reception unit 331 of the server device 3 receives the one-way association request transmitted from the terminal device 2 via the communication interface 31, increments the number of times the viewing user has made one-way association by "1", and stores the incremented number of times the viewing user has made one-way association in the storage device 32 in association with the user ID included in the association request. Then, the process concerning the association request ends.

Note that in a case where a one-way association request made by a viewing user to a distributing user is transmitted to the server device 3, and thereafter, the server device 3 receives a request for refusing the one-way association from the terminal device 2 of the distributing user, the server device 3 may determine that the one-way association fails and need not increment the number of times the viewing user has made one-way association.

The reproduction unit 274 obtains (receives) from the server device 3 at a predetermined timing, information indicating the number of times one-way association has been made and stores the information in the storage device 22. In a case where the number of times the current viewing user has made a request for association to other users exceeds a predetermined number of times, the reproduction unit 274 changes display of a gift object corresponding to a display request. In a case where the number of times the current distributing user has received a request for association from other users exceeds a predetermined number of times, the reproduction unit 274 may change display of a gift object corresponding to a display request. Accordingly, as a viewing user is involved in the video distribution system 1 more actively, the possibility that display of a gift object changes increases, and the motivation of the viewing user to view can be increased accordingly.

In a case where one-way association from user A to user B is successful and one-way association from user B to user A is successful, the reproduction unit 274 determines that a mutual following relationship between user A and user B is established and increments the number of mutual followers of user A and the number of mutual followers of user B by "1". In a case where the number of mutual followers of the current distributing user is greater than or equal to a predetermined number, the reproduction unit 274 may change display of a gift object corresponding to a display request. In a case where the number of mutual followers of the current viewing user is greater than or equal to a predetermined number, the reproduction unit 274 may change display of a gift object corresponding to a display request. Accordingly, as a viewing user is involved in the video distribution system 1 more actively, the possibility that display of a gift object changes increases, and the motivation of the viewing user to view can be increased accordingly.

In a case where the number of displayed pieces of evaluation data transmitted by one or more viewing users for a distribution screen that is currently distributed exceeds a predetermined number, the reproduction unit 274 may change display of a gift object corresponding to a display request. Accordingly, as the number of pieces of evaluation data sent for the distribution screen on which the character object of the current distributing user is displayed (for example, the number of times evaluation "Like" has been received) increases, the possibility that display of a gift object changes increases, and the motivation of a viewing user to send evaluation data can be increased accordingly.

In a case where the number of displayed pieces of comment data transmitted by one or more viewing users for a distribution screen that is currently distributed exceeds a predetermined number, the reproduction unit 274 may change display of a gift object corresponding to a display request. Accordingly, as the number of comments sent for the distribution screen on which the character object of the current distributing user is displayed increases, the possibility that display of a gift object changes increases, and the motivation of a viewing user to send a comment can be increased.

The reproduction unit 274 may change display of a gift object corresponding to a display request in accordance with the tendency of video distribution by the current distributing user. In this case, for example, the time when each distributing user started distribution of a distribution screen and/or the distribution time of a distribution screen of each distributing user (the distribution start time and the distribution end time) may be stored in the storage device 32 in association with the user ID of the distributing user. The reproduction unit 274 obtains from the server device 3 the time when each distributing user started distribution of a distribution screen and/or the distribution time of a distribution screen of each distributing user (the distribution start time and the distribution end time) and determines whether the distributing user has distributed a distribution screen in each of the plurality of consecutive periods.

In a case where the current distributing user has distributed a distribution screen in consecutive periods and the number of the consecutive periods exceeds a predetermined number, the reproduction unit 274 changes display of a gift object corresponding to a display request. For example, in a case where the current distributing user distributes a distribution screen every day for a predetermined number of days, the reproduction unit 274 may change display of a gift object corresponding to a display request. Accordingly, as a distributing user is involved in the video distribution system 1 more actively, the possibility that display of a gift object sent from a viewing user changes increases, and the motivation of the distributing user to distribute can be increased.

The reproduction unit 274 may count the number of terminal devices 2 of viewing users who are viewing a distribution screen that is currently distributed (the number of viewing users currently viewing). In this case, in a case where the number of terminal devices 2 of viewing users to which the distribution screen is distributed exceeds a predetermined number, the reproduction unit 274 may change display of a gift object corresponding to a display request. Accordingly, as the number of viewing users of the distribution screen increases, the possibility that display of a gift object sent from a viewing user changes increases, and the motivation of the distributing user to distribute can be increased.

The reproduction unit 274 may change display of a gift object corresponding to a display request on the basis of the distribution time of distribution by the current distributing user. For example, in a case where the distribution time from the start of distribution of a distribution screen that is currently distributed to the current time exceeds a predetermined time, the reproduction unit 274 may change display of a gift object. In a case where the total distribution time of distribution by the current distributing user during a predetermined period exceeds a predetermined time, the reproduction unit 274 may change display of a gift object (for example, the reproduction unit 274 changes display of a gift object displayed on a distribution screen of the current distributing user for which the total distribution time in March 2020 exceeds 10 hours). Accordingly, the possibility that display of a gift object sent from a viewing user changes increases in accordance with the distribution time of distribution screens by the distributing user, and the motivation of the distributing user to distribute can be increased.

As described in detail above, in the video distribution system 1, display of the same gift object can be automatically changed on the basis of information about the distributing user concerned in the distribution screen and/or information about the viewing user who has made a display request. With the video distribution system 1 thus configured, the motivation of the distributing user and/or the viewing user to participate in a distribution event can be increased.

In a case where the time point when any of the above-described conditions based on which display of a gift object is changed is satisfied is within a first period, the reproduction unit 274 may change display of the gift object to first display. In a case where the above-described time point is within a second period, the reproduction unit 274 may change display of the gift object to second display. For example, in a case where the time point when any of the above-described conditions (for example, the condition that points associated with the user ID of a viewing user included in a display request exceeds a predetermined number of points) based on which display of a gift object is changed is satisfied is in the nighttime (from 18:00 to 6:00 the next day), the reproduction unit 274 may add a predetermined image (for example, an image of the "moon") to the gift object and/or change the display color of the gift object to a darker color. In a case where the time point when any of the above-described conditions based on which display of a gift object is changed is satisfied is in the daytime (from 6:00 to 18:00), the reproduction unit 274 may add a predetermined image (for example, an image of the "sun") to the gift object and/or change the display color of the gift object to a brighter color. The first period and the second period may be any periods that define any of the four seasons or may be periods in which the average temperature is higher than or equal to a predetermined temperature and/or lower than a predetermined temperature. In a case where the time point when any of the above-described conditions based on which display of a gift object is changed is satisfied is in a period during which a specific event takes place, the reproduction unit 274 may change the gift object to a gift object corresponding to the event period. The gift object corresponding to the event period is, for example, a gift object that is available during the event period or a gift object that is designed so as to match the concept introduced during the event period.

In a case where a gift object included in a distribution screen in accordance with a display request from the terminal device 2 of a viewing user is for displaying a plurality of types of object images, the reproduction unit 274 may change display of one of the object images or change display of both the object images.

A description is given of an example case where the gift object is the "fishing rod" object illustrated in FIG. 5B to FIG. 9A. In a case where a specific condition (the condition that the number of displayed pieces of evaluation data transmitted by one or more viewing users for a distribution screen that is currently distributed exceeds a predetermined number) among the above-described conditions based on which display of a gift object is changed is not satisfied, the reproduction unit 274 extracts probabilities associated with the selection probability ID "L-01" from the selection probability table T4 and performs a selection process on the basis of the extracted probabilities to thereby display one fish object. On the other hand, in a case where the specific condition is satisfied, the reproduction unit 274 extracts probabilities associated with the selection probability ID "L-02" from the selection probability table T4 and performs a selection process on the basis of the extracted probabilities to thereby display one fish object.

Accordingly, when the condition based on which display of a gift object is changed is satisfied, the possibility that a fish object of a high degree of rarity is displayed increases, and the motivation of the viewing user to display a gift object can be increased. In a case where each of the plurality of viewing users has made a display request for displaying the "fishing rod" object and where the condition for changing display of a gift object is a condition concerning information about the viewing user, a fish object that appears changes in accordance with the "fishing rod" object (in accordance with information about the viewing user), and therefore, a highly entertaining video distribution can be provided. Note that a fish object of a higher degree of rarity may be designed so as to look spectacular.

Note that in a case where the specific condition among the above-described conditions based on which display of a gift object is changed is satisfied, the reproduction unit 274 may change display of the "fishing rod" object and subsequently change the selection probability. Further, in the case where the specific condition among the above-described conditions based on which display of a gift object is changed is satisfied, the reproduction unit 274 may decrease or increase the period from when the "fishing rod" object appears to when the fish object moves to a predetermined position.

Fourth Modification

At least some of the functions implemented by the processor 27 of the terminal device 2 may be implemented by a processor other than the processor 27 of the terminal device 2. At least some of the functions implemented by the processor 27 of the terminal device 2 may be implemented by, for example, the processor 33 of the server device 3. Specifically, some of the functions of the reproduction unit 274 (the function of generating an animation of a character object and/or the function of generating a distribution screen) may be executed by the server device 3. For example, distribution data for displaying a distribution screen generated by the server device 3 may be transmitted to each terminal device 2, and the terminal device 2 may display the distribution screen on the basis of the received distribution data. Further, the transmission unit 272 of the terminal device 2 of a distributing user may transmit video data of a distribution screen displayed on the basis of drawing data generated by the reproduction unit 274 of the terminal device 2 of the distributing user to the terminal device 2 of a viewing user that has not transmitted a display request, via the server device 3. Accordingly, the terminal device 2 of the viewing user that has not transmitted a display request can display a distribution screen the same as the distribution screen displayed on the terminal device 2 of the distributing user only by obtaining the video data. For example, in the operation sequence illustrated in FIG. 12, steps S101 to S103 are not performed, and the reproduction unit 274 of the terminal device 2a performs step S104. Next, the transmission unit 272 of the terminal device 2a transmits video data of the distribution screen displayed in step S104, and the distribution unit 332 of the server device 3 distributes the video data received from the terminal device 2a to the terminal device 2b and the terminal device 2c via the communication interface 31. Further, step S110 is not performed, and the transmission unit 272 of the terminal device 2a transmits video data of a distribution screen displayed in step S114, and the distribution unit 332 of the server device 3 distributes the video data received from the terminal device 2a to the terminal device 2c via the communication interface 31.

Fifth Embodiment

Note that the video distribution system 1 may be configured so as to allow a viewing user to make a joint performance request for requesting a joint performance with a distributing user. For example, in a case where a joint performance request button is displayed on a distribution screen displayed on the terminal device 2 of a viewing user, in response to the viewing user selecting the joint performance request button by operating the input device 24, the terminal device 2 transmits a joint performance request to the server device 3, and the server device 3 transmits the joint performance request to the terminal device 2 of the distributing user.

When receiving the joint performance request, the terminal device 2 of the distributing user at least displays an approval button for approving the joint performance request. In a case where the approval button is selected by the distributing user operating the input device 24, the terminal device 2 of the distributing user determines that the distributing user has approved the joint performance request and transmits information about joint performance approval to the server device 3. Hereinafter, the viewing user for which the joint performance request is approved may be referred to as a jointly performing user.

When receiving the information about the joint performance approval from the terminal device 2 of the distributing user, the server device 3 transmits the information about the joint performance approval to the terminal device 2 of the jointly performing user. When receiving the information about joint performance approval from the server device 3, the terminal device 2 of the jointly performing user transmits to the server device 3 motion data for generating the character object of the jointly performing user, or the motion data and sound data. Here, the terminal device 2 of the jointly performing user displays, on the basis of motion data for generating the character object of the distributing user and the motion data for generating the character object of the jointly performing user, a joint performance video distribution screen that includes the character object of the distributing user and the character object of the jointly performing user.

When receiving the motion data for generating the character object of the jointly performing user, or the motion data and the sound data from the server device 3, the terminal device 2 of the distributing user displays, on the basis of the motion data for generating the character object of the distributing user and the motion data for generating the character object of the jointly performing user, a joint performance video distribution screen that includes the character object of the distributing user and the character object of the jointly performing user.

The terminal device 2 of the distributing user transmits the motion data for generating the character object of the distributing user and the motion data for generating the character object of the jointly performing user to the server device 3, the server device 3 transmits the motion data for generating the character object of the distributing user and the motion data for generating the character object of the jointly performing user to the terminal device 2 of a viewing user different from the jointly performing user, and the terminal device 2 of the viewing user different from the jointly performing user displays a joint performance video distribution screen. Hereinafter, the jointly performing user is referred to as a distributing user.

Note that the server device 3 may generate distribution data for displaying the joint performance video distribution screen. In this case, the server device 3 has the functions of the reproduction unit 274 of the terminal device 2 of a distributing user, and generates distribution data for displaying the joint performance video distribution screen that includes the character object of the distributing user and the character object of the jointly performing user on the basis of the motion data for generating the character object of the distributing user and the motion data for generating the character object of the jointly performing user received from the terminal device 2 of the distributing user and the terminal device 2 of the jointly performing user.

In a case where the server device 3 receives a joint performance request from the terminal device 2 of a viewing user, the administration manager who manages the server device 3 may approve the joint performance request by operating the server device 3.

The joint performance video distribution screen may include a video in which a joint performance by character objects of three of more distributing users takes place. That is, a virtual joint performance may take place in a video by three or more distributing users using their characters.

A case where the terminal devices 2 of a plurality of viewing users transmit a display request for the above-described "fishing rod" object to each of the plurality of distributing users who are currently in a joint performance is described. The terminal device 2 of a viewing user can transmit a display request for the "fishing rod" object to the terminal device 2 of any one of the plurality of distributing users who are currently in the joint performance. In this case, the reproduction unit 274 of each terminal device 2 counts the number of times a fish object has appeared and calculates the number of fishing points based on the counted number, for each of the distributing users. The reproduction unit 274 determines the rankings of the plurality of distributing users who are currently in the joint performance on the basis of the calculated numbers of fishing points.

The reproduction unit 274 of each terminal device 2 may give each distributing user a bonus corresponding to the determined ranking or the calculated number of fishing points. The reproduction unit 274 may give a bonus to a distributing user of a ranking higher than or equal to a predetermined ranking or a distributing user having a number of fishing points greater than or equal to a predetermined value.

In this case, the above-described condition based on which display of a gift object is changed may be the condition that the number of distributing users who are currently in a joint performance exceeds a predetermined number. Accordingly, as the number of jointly performing users increases, the possibility that display of a gift object sent from a viewing user changes increases, and the motivation of the distributing users for a joint performance can be increased.

Further, the reproduction unit 274 of each terminal device 2 may change display of a gift object corresponding to a display request on the basis of the number of character objects included in the joint performance video distribution screen. For example, as the number of character objects increases, a gift object designed so as to look more spectacular is displayed.

The reproduction unit 274 of each terminal device 2 may change display of a gift object corresponding to a display request on the basis of the number of times a joint performance video distribution screen is displayed. For example, for a joint performance video distribution screen including a character object that is displayed on joint performance video distribution screens a larger number of times, a gift object designed so as to look more spectacular may be displayed. For example, as the number of times a joint performance video distribution screen including a combination of specific character objects is displayed increases, a gift object designed so as to look more spectacular may be displayed. For example, for a joint performance video distribution screen including a character object that participates in joint performances with different character objects a larger number of times, a gift object designed so as to look more spectacular may be displayed.

Sixth Modification

The distribution screens (400, 500, 510, 600, 610, 700, 710, 800, 810, 900, and 910) displayed on the terminal device 2 of a distributing user need not be the same as the distribution screens (400, 500, 510, 600, 610, 700, 710, 800, 810, 900, and 910) displayed on the terminal device 2 of a viewing user. For example, a distribution screen displayed on the terminal device 2 of a distributing user need not include the evaluation button 402, the gift button 403, or the comment button 404.

Figure 13:
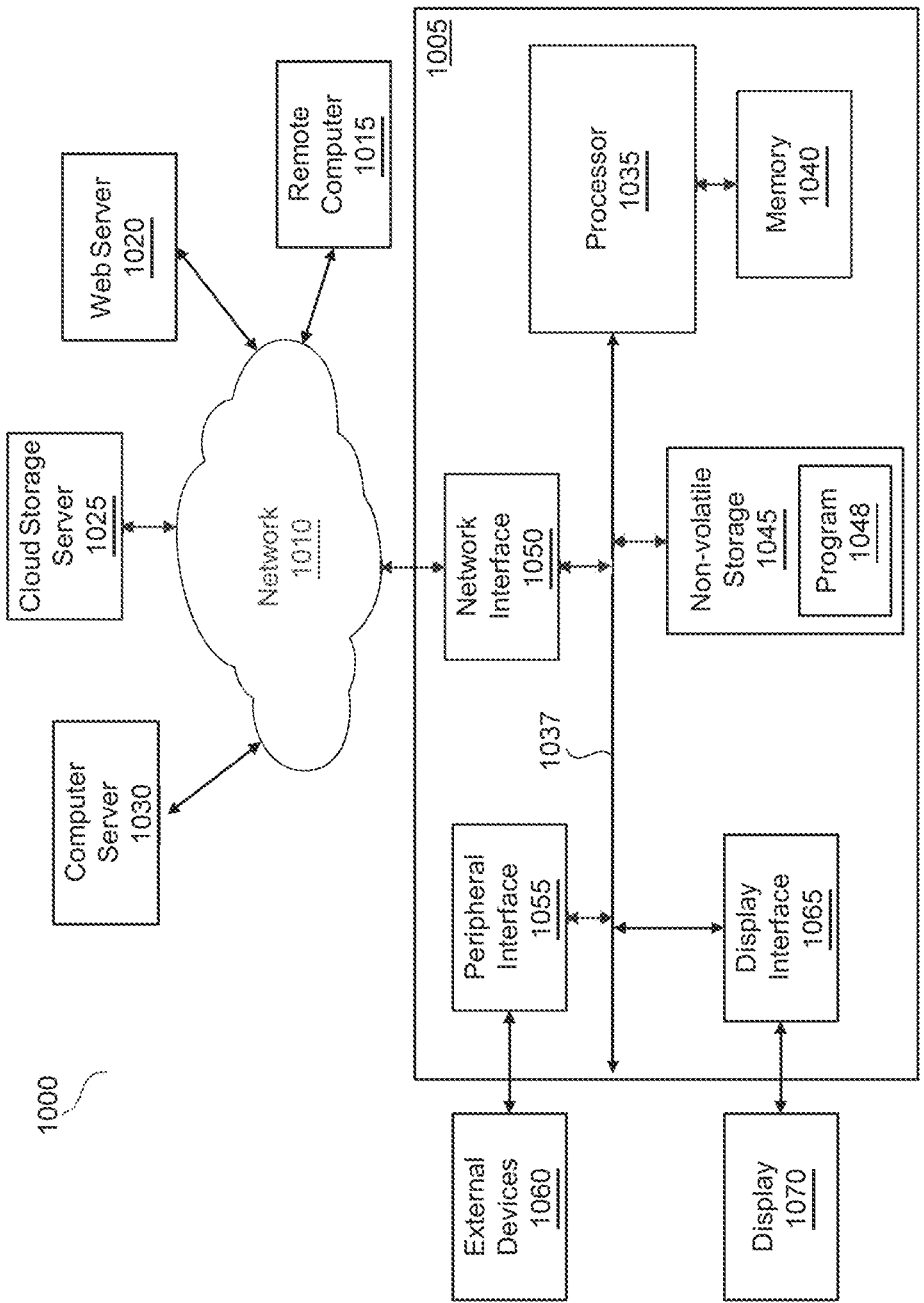
FIG. 13 is a block diagram of computer-based circuitry that may be used to implement control features of the present disclosure.

FIG. 13 illustrates a block diagram of a computer that may implement the various embodiments described herein. The present disclosure may be embodied as a system, a method, and/or a computer program product. The computer program product may include a non-transitory computer readable storage medium on which computer readable program instructions are recorded that may cause one or more processors to carry out aspects of the embodiment. For example, processor 27 and other components of terminal device 2 as well as attached components may be configured to include various elements depicted in FIG. 13. Additionally, processor 33 and other components of server device 3 as well as attached components may be configured to include various elements depicted in FIG. 13.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 13 is a functional block diagram illustrating a networked system 1000 of one or more networked computers and servers. In an embodiment, the hardware and software environment illustrated in FIG. 13 may provide an exemplary platform for implementation of the software and/or methods according to the present disclosure.

Referring to FIG. 13, a networked system 1000 may include, but is not limited to, computer 1005, network 1010, remote computer 1015, web server 1020, cloud storage server 1025 and compute server 1030. In some embodiments, multiple instances of one or more of the functional blocks illustrated in FIG. 13 may be employed.

Additional detail of computer 1005 is shown in FIG. 13. The functional blocks illustrated within computer 1005 are provided only to establish exemplary functionality and are not intended to be exhaustive. And while details are not provided for remote computer 1015, web server 1020, cloud storage server 1025 and compute server 1030, these other computers and devices may include similar functionality to that shown for computer 1005.

Computer 1005 may be a personal computer (PC), a desktop computer, laptop computer, tablet computer, notebook computer, a personal digital assistant (PDA), a smart phone, or any other programmable electronic device capable of communicating with other devices on network 1010.

Computer 1005 may include processor 1035, bus 1037, memory 1040, non-volatile storage 1045, network interface 1050, peripheral interface 1055 and display interface 1065. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1035 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 1037 may be a proprietary or industry standard high-speed parallel or serial peripheral interconnect bus, such as ISA, PCI, PCI Express (PCI-e), AGP, and the like.

Memory 1040 and non-volatile storage 1045 may be computer-readable storage media. Memory 1040 may include any suitable volatile storage devices such as Dynamic Random Access Memory (DRAM) and Static Random Access Memory (SRAM). Non-volatile storage 1045 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1048 may be a collection of machine readable instructions and/or data that is stored in non-volatile storage 1045 and is used to create, manage and control certain software functions that are discussed in detail elsewhere in the present disclosure and illustrated in the drawings. In some embodiments, memory 1040 may be considerably faster than non-volatile storage 1045. In such embodiments, program 1048 may be transferred from non-volatile storage 1045 to memory 1040 prior to execution by processor 1035.

Computer 1005 may be capable of communicating and interacting with other computers via network 1010 through network interface 1050. Network 1010 may be, for example, a local area network (LAN), a wide area network (WAN) such as the Internet, or a combination of the two, and may include wired, wireless, or fiber optic connections. In general, network 1010 can be any combination of connections and protocols that support communications between two or more computers and related devices.

Peripheral interface 1055 may allow for input and output of data with other devices that may be connected locally with computer 1005. For example, peripheral interface 1055 may provide a connection to external devices 1060. External devices 1060 may include devices such as a keyboard, a mouse, a keypad, a touch screen, and/or other suitable input devices. External devices 1060 may also include portable computer-readable storage media such as, for example, thumb drives, portable optical or magnetic disks, and memory cards. Software and data used to practice embodiments of the present disclosure, for example, program 1048, may be stored on such portable computer-readable storage media. In such embodiments, software may be loaded onto non-volatile storage 1045 or, alternatively, directly into memory 1040 via peripheral interface 1055. Peripheral interface 1055 may use an industry standard connection, such as RS-232 or Universal Serial Bus (USB), to connect with external devices 1060.

Display interface 1065 may connect computer 1005 to display 1070. Display 1070 may be used, in some embodiments, to present a command line or graphical user interface to a user of computer 1005. Display interface 1065 may connect to display 1070 using one or more proprietary or industry standard connections, such as VGA, DVI, DisplayPort and HDMI.

As described above, network interface 1050, provides for communications with other computing and storage systems or devices external to computer 1005. Software programs and data discussed herein may be downloaded from, for example, remote computer 1015, web server 1020, cloud storage server 1025 and compute server 1030 to non-volatile storage 1045 through network interface 1050 and network 1010. Furthermore, the systems and methods described in this disclosure may be executed by one or more computers connected to computer 1005 through network interface 1050 and network 1010. For example, in some embodiments the systems and methods described in this disclosure may be executed by remote computer 1015, computer server 1030, or a combination of the interconnected computers on network 1010.

Data, datasets and/or databases employed in embodiments of the systems and methods described in this disclosure may be stored and or downloaded from remote computer 1015, web server 1020, cloud storage server 1025 and compute server 1030.

What is claimed is:

1. A system, comprising:
    processing circuitry configured to:
        transmit first information for displaying a video including a first character object based on a first user of a first terminal device;
        receive, from at least one second terminal device of a plurality of second terminal devices in a case that a second terminal device displays the video, a request for a first gift for the first character object;
        generate second information for displaying video that includes the first character object and a first object representing a first gift for the first character object in the video; and
        transmit the second information to a second terminal device of the plurality of second terminal devices, wherein
    the processing circuitry generates the second information based on a time period in which the second information is transmitted or a number of terminal devices to which the second information is transmitted.

2. The system according to claim 1, wherein the processing circuitry transmits the first information to the plurality of second terminal devices.

3. The system according to claim 1, wherein
    the processing circuitry is further configured to count the number of terminal devices to which the second information is transmitted, and
    display of the first object is changed based on the counted number of terminal devices.

4. The system according to claim 1, wherein display of a particular first object is changed based on information about a number of requests for a first gift for the first character object received by the first terminal device from plural second terminal devices including the at least one second terminal device.

5. The system according to claim 1, wherein display of a particular first object is changed based on a number of users associated with the first user.

6. The system according to claim 1, wherein
    the processing circuitry is further configured to distribute, in response to receiving from a second terminal device a second request for input information of the first character object, the first information so that the first information further includes the input information, and
    display of the first object is changed based on information about a number of requests for the input information.

7. The system according to claim 1, wherein
    a second terminal device of a second user making the request for a first gift is permitted to transmit a second request for input information of a character object generated based on motion of another user, and display of the first object is changed based on information about a number of requests for the input information transmitted from the second terminal device.

8. The system according to claim 6, wherein an input information is text information or evaluation information of the first character object.

9. The system according to claim 1, wherein in changing display of a first object, after an elapse of a predetermined time since a start of distribution of the video including a first object, third information for displaying the video further includes a second object is based on first user information about the first user or second user information about the user making the request for a first gift.

10. The system according to claim 9, wherein the processing circuitry is further configured to:

distribute fourth information, for displaying video that includes at least the first character object and a second character object generated based on motion of the second user, to a third terminal device of a third user different from the first user and the second user;

distribute, in accordance with a second request for a first gift for one of the first character object or the second character object, third information to a third terminal device; and in a case where the video includes a first object for the first character object and a first object for the second character object, determine a ranking of the first user and a ranking of the second user based on a number of points associated with the second object for the first character object and the number of points associated with the second object for the second character object.

11. The system according to claim 10, wherein the processing circuitry is configured to provide at least one of the first user or the second user a bonus according to the number of points associated with the second object for the first character object and the number of points associated with the second object for the second character object.

12. The system according to claim 1, wherein based on the second information, display of a first object by the first terminal device is different from display of a first object by a second terminal device.

13. The system according to claim 1, wherein the processing circuitry is further configured to distribute first information to a third terminal device of a third user being different from the first user and the second user, and distribute second information to a third user, and based on second information, display of a first object by a second terminal device is different from display of a first object by a third terminal device.

14. The system according to claim 1, wherein the processing circuitry is further configured to store the first user information corresponding to a first state of a first object, and store the second user information corresponding to a second state of a first object.

15. The system according to claim 14, wherein display of a first object by the first terminal device corresponds to the first state of the first object, and display of a first object by the second terminal device corresponds to the second state of the first object.

16. A video distribution method, comprising:

transmitting first information for displaying a video including a first character object based on a first user of a first terminal device;

receiving, from at least one second terminal device of a plurality of second terminal devices in a case that a second terminal device displays the video, a request for a first gift for the first character object;

generating second information for displaying video that includes the first character object and a first object representing a first gift for the first character object in the video; and transmitting the second information to a second terminal device of the plurality of second terminal devices, wherein the second information is generated based on a time period in which the second information is transmitted or a number of terminal devices to which the second information is transmitted.

17. The video distribution method according to claim 16, wherein display of a particular first object is changed based on information about a number of requests for a first gift for the first character object received by the first terminal device from plural second terminal devices including the at least one second terminal device.

18. The video distribution method according to claim 16, wherein display of a particular first object is changed based on a number of users associated with the first user.

19. The video distribution method according to claim 16, further comprising:

transmitting, in response to receiving a request for input information of the first character object from a second terminal device, the first information so that the first information further includes the input information, wherein display of the first object is changed based on information about a number of requests for the input information.

20. A non-transitory computer readable medium storing computer executable instructions which, when executed by processing circuitry of a computer, cause the processing circuitry to:

transmit first information for displaying a video including a first character object based on a first user of a first terminal device;

receive, from at least one second terminal device of a plurality of second terminal devices in a case that a second terminal device displays the video, a request for a first gift for the first character object;

generate second information for displaying video that includes the first character object and a first object representing a first gift for the first character object in the video; and transmit the second information to a second terminal device of the plurality of second terminal devices, wherein the second information is generated based on a time period in which the second information is transmitted or a number of terminal devices to which the second information is transmitted.

* * * * *